(12) United States Patent
Mayumi et al.

(10) Patent No.: US 11,182,020 B2
(45) Date of Patent: Nov. 23, 2021

(54) POSITION DETECTION DEVICE, ELECTRONIC DEVICE EQUIPPED WITH SAME, AND POSITION DETECTION METHOD

(71) Applicant: SHARP KABUSHIKI KAISHA, Osaka (JP)

(72) Inventors: Masashi Mayumi, Osaka (JP); Teruhisa Masui, Osaka (JP); Atsushi Aoki, Osaka (JP); Yousuke Nakamura, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 91 days.

(21) Appl. No.: 16/623,274

(22) PCT Filed: Jun. 14, 2018

(86) PCT No.: PCT/JP2018/022669
§ 371 (c)(1),
(2) Date: Dec. 16, 2019

(87) PCT Pub. No.: WO2018/235706
PCT Pub. Date: Dec. 27, 2018

(65) Prior Publication Data
US 2020/0183521 A1    Jun. 11, 2020

(30) Foreign Application Priority Data

Jun. 21, 2017 (JP) .............................. JP2017-120993

(51) Int. Cl.
*G06F 3/041*    (2006.01)
*G06F 3/047*    (2006.01)
*G06F 3/044*    (2006.01)

(52) U.S. Cl.
CPC ........ *G06F 3/041661* (2019.05); *G06F 3/041* (2013.01); *G06F 3/0412* (2013.01); *G06F 3/047* (2013.01); *G06F 3/0446* (2019.05)

(58) Field of Classification Search
CPC ........ G06F 3/047; G06F 3/0412; G06F 3/044; G06F 3/041; G06F 3/03; G06F 3/01;
(Continued)

(56) References Cited

U.S. PATENT DOCUMENTS 9,977,519 B2 * 5/2018 Lukanc ................. G06F 3/0383
10,353,493 B2 * 7/2019 Birenberg ........... G06F 3/04162
(Continued)

FOREIGN PATENT DOCUMENTS

JP    2013-084168 A    5/2013
JP    2016-028342 A    2/2016

*Primary Examiner* — Julie Anne Watko
(74) *Attorney, Agent, or Firm* — ScienBiziP, P.C.

(57) ABSTRACT

A position detection device includes a sensor driving unit driving a touch sensor by providing a drive signal of a sine-wave to the touch sensor and a position detecting unit detecting a position of a touch on the touch sensor. The position detecting unit includes a first detection processing unit performing a touch detection process using an amplitude modulation scheme during a first detection processing period and a second detection processing unit performing the touch detection process using a frequency modulation scheme during a second detection processing period. A position detection method includes a sensor driving step of driving the touch sensor and a position detecting step of detecting the position. The position detecting step includes a first detection processing step of performing the touch detection process using the amplitude modulation scheme and a second detection processing step of performing the touch detection process using the frequency modulation scheme.

13 Claims, 22 Drawing Sheets

(58) Field of Classification Search
CPC .............. G06F 3/00; G06F 3/0443; G06F 2203/04108; G06F 3/041661; G06F 3/0446

See application file for complete search history.

(56) References Cited

U.S. PATENT DOCUMENTS

| | | |
|---|---|---|
| 2013/0093722 A1 | 4/2013 | Noguchi et al. |
| 2014/0028577 A1* | 1/2014 | Krah .............. G06F 3/0445 345/173 |

* cited by examiner

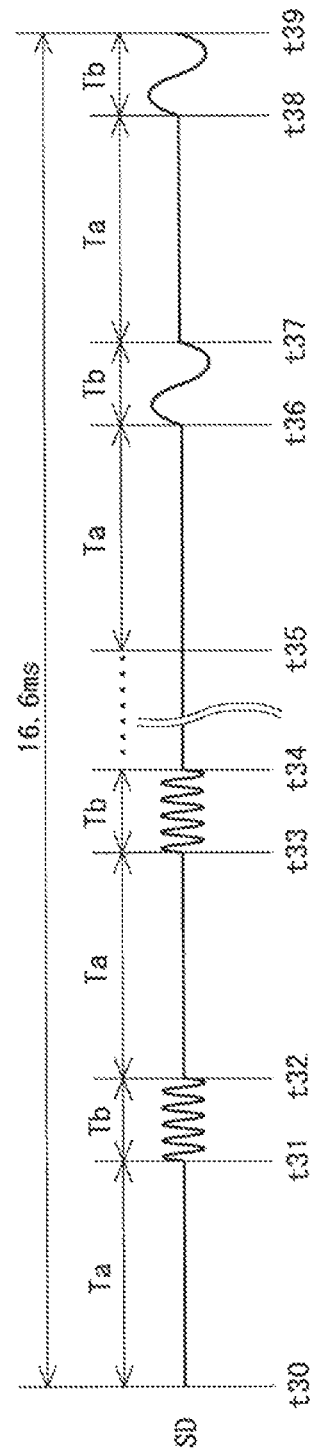

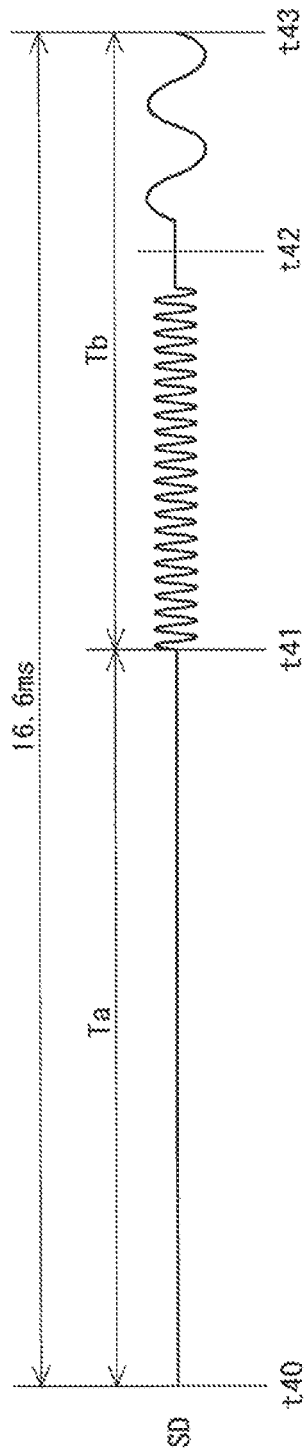

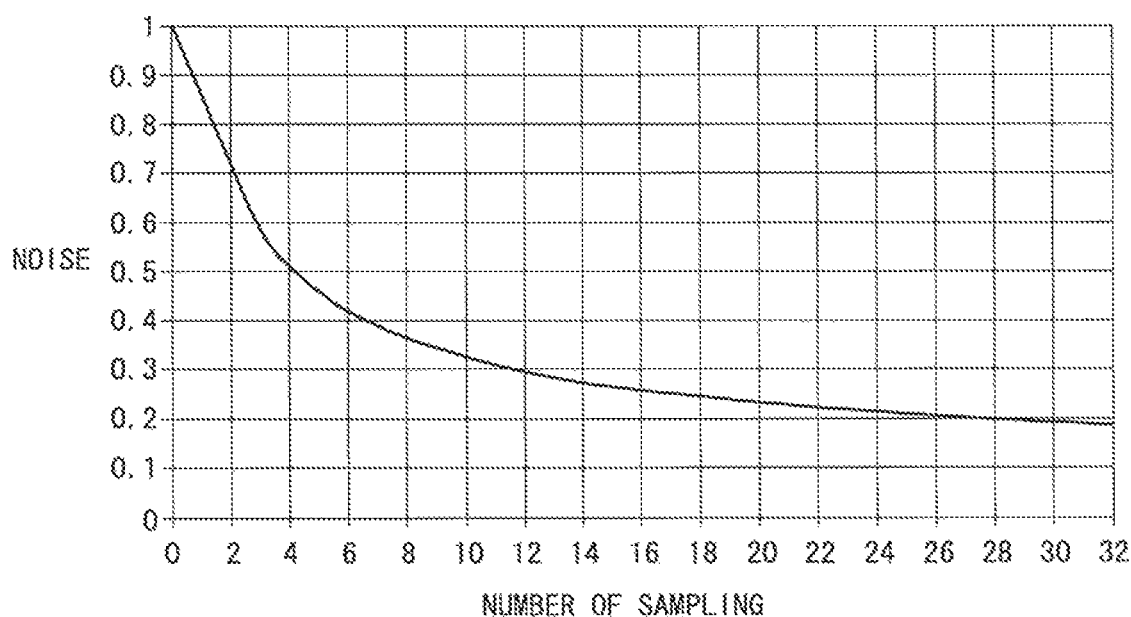

Fig. 25

| MATERIAL | CURAD LATEX GLOVE | RUBBER GLOVE | COTTON WORK GLOVE | WOOL GLOVE | CUT RESISTANT GLOVE | LEATHER GLOVE | SKI GLOVE |
|---|---|---|---|---|---|---|---|
| | THIN RUBBER | THICK RUBBER | COTTON | WOOL | NYLON | LEATHER | NYLON |
| THICKNESS | 0.1mm | 0.2mm | 2mm | 1mm | 1.5mm | 2mm | 4.5mm |

--RELATED ART--

--RELATED ART--

--RELATED ART--

POSITION DETECTION DEVICE, ELECTRONIC DEVICE EQUIPPED WITH SAME, AND POSITION DETECTION METHOD

TECHNICAL FIELD

The following disclosure relates to a position detection device including a touch panel (touch sensor), and a position detection method using a touch panel (touch sensor).

BACKGROUND ART

In recent years, electronic devices that can be operated by touching a screen with a finger, a pen, etc., have been widely spread. For example, electronic devices (mobile phones, tablet terminals, etc.) including a touch panel are remarkably widespread. In a capacitive-type touch panel, a position (touch position) of a recognition object such as a user (operator)'s finger or a pen (touch pen) is detected based on a change in electrostatic capacitance. Such a capacitive-type touch panel is generally used integrally with a display device such as a liquid crystal display device. Note that, in this specification, a device composed of a touch panel and a controller (touch panel controller) that controls the operation of the touch panel is referred to as "position detection device".

As schemes for position detection by a capacitive type, a self-capacitance scheme and a mutual capacitance scheme are known. The self-capacitance scheme is a scheme in which a position of a recognition object is measured by detecting an increase in electrostatic capacitance caused by the contact or approach of the recognition object to the touch panel. The mutual capacitance scheme is a scheme in which a position of a recognition object is measured based on a difference in electrostatic capacitance between adjacent sensors that occurs due to the contact or approach of the recognition object to the touch panel. Note that a touch panel capable of performing position detection using both the self-capacitance scheme and the mutual capacitance scheme is also developed.

Meanwhile, the touch panel is conventionally known to be susceptible to noise (display noise) from the display device. A high-sensitivity capacitive-type touch panel is particularly susceptible to noise, and thus, if driving of the touch panel and driving of the display device interfere with each other, then an unintended malfunction is caused. In addition to the display noise, there is also noise that influences the operation of the touch panel. For example, common-mode noise, power supply noise, and radio noise from an external source influence the operation of the touch panel. Hence, various types of measures are conventionally taken to reduce the influence of such noise.

Note that the following prior art documents are known regarding this matter. Japanese Laid-Open Patent Publication No. 2016-028342 discloses an invention of an electronic device that accurately performs touch detection by generating a demodulated signal using both a response from a sensor system obtained during a period during which an excitation generating unit outputs a sine wave and a response from the sensor system obtained during a period during which the excitation generating unit does not output a sine wave. In addition, Japanese Laid-Open Patent Publication No. 2013-084168 discloses an invention of a display device in which in order to increase the flexibility of touch detection operation, while touch detection elements are driven during N touch detection periods provided in a unit driving period, display driving for M horizontal lines is sequentially performed during the unit driving period (M>N).

PRIOR ART DOCUMENTS

Patent Documents

[Patent Document 1] Japanese Laid-Open Patent Publication No. 2016-028342
[Patent Document 2] Japanese Laid-Open Patent Publication No. 2013-084168

SUMMARY OF THE INVENTION

Problems to be Solved by the Invention

However, in recent years, electronic devices including a capacitive-type touch panel have had a problem of poor touch panel response due to the application of a protective sheet or a protective glass onto the touch panel. The sensor sensitivity of the capacitive-type touch panel is determined depending on a distance between a recognition object such as a finger or a pen and a sensor. Specifically, as the distance from the sensor to the recognition object increases, the sensor sensitivity decreases since the signal value of a detection signal is attenuated as shown in FIG. 31. Therefore, when a protective sheet or a protective glass is applied onto the touch panel, since the distance from the sensor to the recognition object such as a finger (the distance from the sensor to a contact surface) increases as can be grasped from FIG. 32, the sensor sensitivity decreases. As a result, touch panel response becomes poor.

In addition, in recent years, in order to achieve the weight reduction and slimming down of the entire device, development of a display device configured to include a display panel and a touch panel which are integrally formed has progressed. Such a display device includes therein a portion that functions as a touch sensor. Such a display device is hereinafter referred to as "built-in touch sensor type display device". Note that a touch panel of the built-in touch sensor type display device is generally called an "in-cell type touch panel". In the built-in touch sensor type display device, a touch panel is provided between two glass substrates that form a display panel (e.g., a liquid crystal panel), and thus, the distance from the sensor to the recognition object is inevitably long. Due to this, it becomes difficult to secure sufficient sensor sensitivity as compared to a case in which an out-cell type or on-cell type touch panel is adopted.

From the above, a problem to be solved is to secure sufficient sensor sensitivity without being influenced by noise. Note that adjusting sensitivity at a device design stage may be considered, but since an optimal value of sensitivity greatly depends on a user or usage, it is difficult to optimize sensitivity at the device design stage.

An object of the following disclosure is therefore to implement a position detection device having high resistance to noise and excellent sensitivity.

Means for Solving the Problems

A position detection device according to one embodiment is a position detection device having a touch sensor, the position detection device including:
a sensor driving unit configured to drive the touch sensor by providing a drive signal of a sine-wave to the touch sensor; and a position detecting unit configured to detect a position where a touch on the touch sensor is performed, based on a detection signal obtained, depending on the drive signal, from the touch sensor, wherein the position detecting unit includes:
a first detection processing unit configured to perform a touch detection process using an amplitude modulation scheme, based on the detection signal, the touch detection process including a process of determining whether there is a touch on the touch sensor; and
a second detection processing unit configured to perform the touch detection process using a frequency modulation scheme, based on the detection signal, and
a first detection processing period during which the touch detection process is performed by the first detection processing unit and a second detection processing period during which the touch detection process is performed by the second detection processing unit are provided.

Further, a position detection method according to one embodiment is a position detection method using a touch sensor, the position detection method including:

a sensor driving step of driving the touch sensor by providing a drive signal of a sine-wave to the touch sensor; and a position detecting step of detecting a position where a touch on the touch sensor is performed, based on a detection signal obtained, depending on the drive signal, from the touch sensor, wherein the position detecting step including:
a first detection processing step of performing a touch detection process using an amplitude modulation scheme, based on the detection signal, the touch detection process including a process of determining whether there is a touch on the touch sensor; and
a second detection processing step of performing the touch detection process using a frequency modulation scheme, based on the detection signal, and
a first detection processing period during which the touch detection process is performed in the first detection processing step and a second detection processing period during which the touch detection process is performed in the second detection processing step are provided.

Effects of the Invention

According to configurations such as those described above, a touch detection process using the amplitude modulation scheme and a touch detection process using the frequency modulation scheme are performed. Therefore, as results of the touch detection processes, two types of detection results (a detection result based on the amplitude modulation scheme and a detection result based on the frequency modulation scheme) are obtained. Then, it becomes possible to determine whether there is a touch at each location and to identify a touch position, based on the two types of detection results. Here, by performing high-speed driving of the touch sensor when the touch detection process using the amplitude modulation scheme is performed, the number of sampling is increased, enabling to reduce noise. In addition, since noise occurring in an amplitude direction of a detection signal can be removed when the touch detection process using the frequency modulation scheme is performed, the resistance to noise can also be increased. Furthermore, by comparing a detected value with multiple threshold values when the touch detection process using the frequency modulation scheme is performed, identification sensitivity can be increased. From the above, a position detection device and a position detection method that have high resistance to noise and excellent sensitivity are implemented.

BRIEF DESCRIPTION OF THE DRAWINGS

FIG. 16 is a signal waveform diagram for describing driving timing of the touch panel in a second variant.

FIG. 17 is a signal waveform diagram for describing driving timing of the touch panel in a third variant.

FIG. 18 is a graph showing a relationship between the number of sampling and noise regarding the amplitude modulation scheme.

FIG. 19 is a table showing a relationship between the number of sampling and noise regarding the amplitude modulation scheme.

FIG. 25 is a diagram for describing that there are various types of gloves.

MODE FOR CARRYING OUT THE INVENTION

<1. Preface>

Before describing an embodiment, basic matters related to the following embodiment will be described. In recent years, for display devices used in mobile phones (smartphones), one that adopts the above-described in-cell type touch panel (i.e., a built-in touch sensor type display device) has been in the mainstream. The built-in touch sensor type display device is advantageous in terms of slimming down of the entire device and a reduction in manufacturing cost. However, there are concerns that due to the provision of a portion forming the touch panel inside the display device, the display device is susceptible to display noise, and a parasitic capacitance increases (an increase in load). In addition, since a sensor is provided inside a display panel, there is also a disadvantage that the distance between a sensor surface and a touch surface is longer than that in a display device adopting an out-cell type or on-cell type touch panel and therefore the signal value of a detection signal is attenuated. Hence, improvements in the aspect of driving are conventionally made.

As an example of improvements in the aspect of driving, there is a driving method in which a sine wave is used as a drive signal for driving the touch panel. Regarding this, while an amplitude modulation scheme, a frequency modulation scheme, and a phase modulation scheme are known as modulation schemes, in the following embodiment, touch detection (detection of a touched position on the touch panel by determining whether there is a touch at each location on the touch panel) is performed using the amplitude modulation scheme and the frequency modulation scheme.

Figure 2:
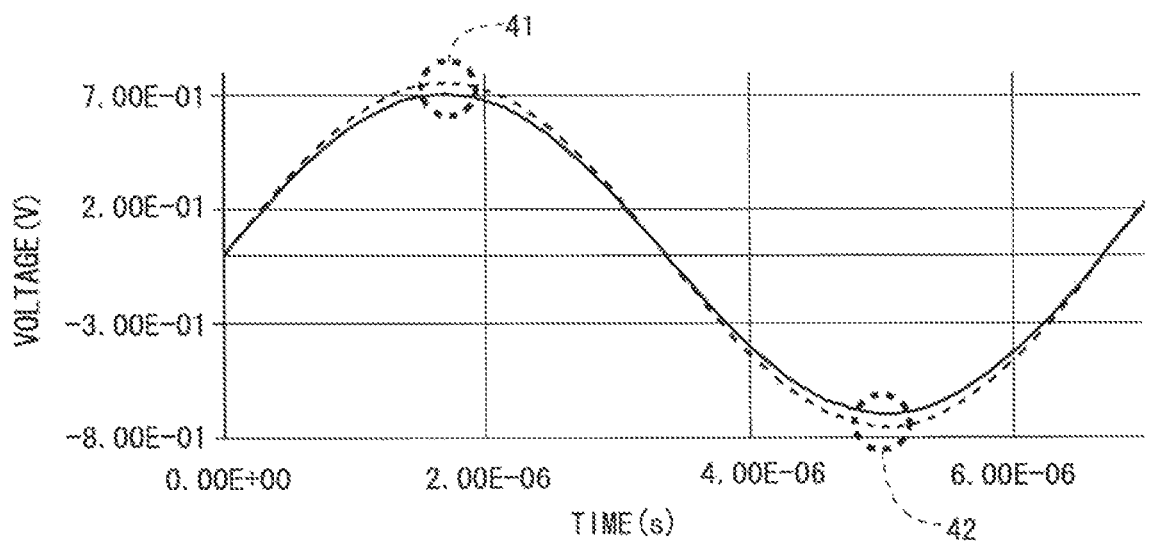
FIG. 2 is a signal waveform diagram for describing an amplitude modulation scheme.

FIG. 2 is a signal waveform diagram for describing the amplitude modulation scheme. In FIG. 2, a waveform of a detection signal obtained when a touch on the touch panel is performed is represented by a solid line, and a waveform of a detection signal obtained when a touch on the touch panel is not performed is represented by a dotted line. As can be grasped from portions indicated by reference characters 41 and 42 in FIG. 2, a difference occurs in the amplitude of the detection signal (sine wave) between when a touch is performed and when a touch is not performed. In the amplitude modulation scheme, sampling of a difference (the amount of change) in the amplitude of the sine wave is performed, and the integrated value of values obtained by the sampling is calculated as a detected value for determining whether there is a touch. Note that in the following a detected value obtained using the amplitude modulation scheme may be referred to as "first detected value" in order to discriminate the detected value from a detected value obtained using the frequency modulation scheme.

Figure 3:
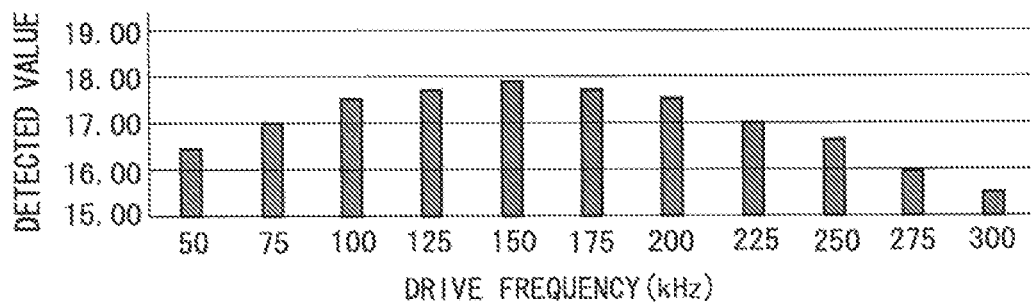
FIG. 3 is a graph showing a relationship between a drive frequency and a detected value regarding the amplitude modulation scheme.

Meanwhile, in the amplitude modulation scheme, the number of the above-described sampling increases as the drive frequency increases. However, as shown in FIG. 3, increasing the drive frequency does not necessarily increase the detected value (first detected value) unlimitedly. In the example shown in FIG. 3, the largest detected value is obtained when the drive frequency is 150 kHz. A reason that increasing the drive frequency does not necessarily increase the detected value unlimitedly as such is related to a load model of the panel of the built-in touch sensor type display device, and is because a sufficient amount of change (a difference between the amplitude of a detection signal obtained when a touch is performed and the amplitude of a detection signal obtained when a touch is not performed) cannot be obtained when the drive frequency is too high. From such a fact, in a case in which the amplitude modulation scheme is adopted, setting of an optimal drive frequency conforming to the load model of the panel is necessary. Hence, in the following embodiment, it is assumed that a drive signal with an optimal drive frequency is provided to the touch panel when touch detection is performed using the amplitude modulation scheme.

Figure 4:
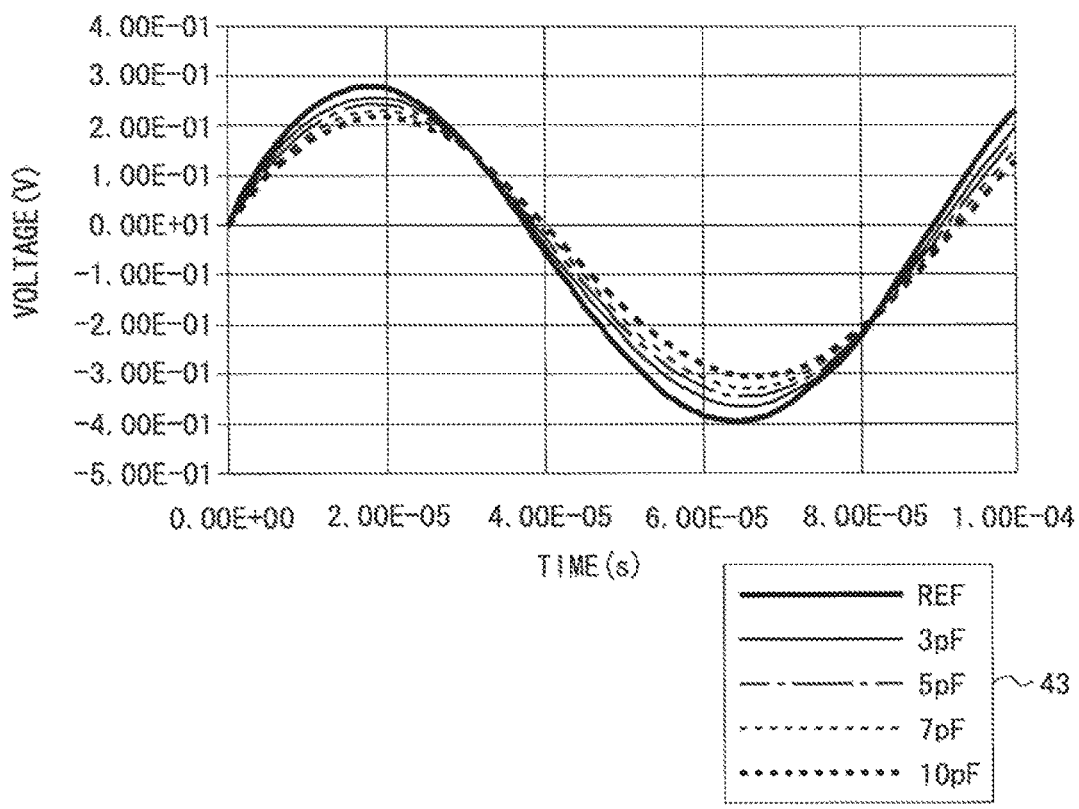
FIG. 4 is a signal waveform diagram for describing a frequency modulation scheme.

FIG. 4 is a signal waveform diagram for describing the frequency modulation scheme. FIG. 4 shows waveforms of detection signals for a reference value REF serving as a reference and for each detected capacitance value. A legend is shown in a box given reference character 43 in FIG. 4. Note that generally the capacitive component of a finger is about 3 to 5 pF. It can be grasped from FIG. 4 that a phase shift occurs depending on the magnitude of the detected capacitance value. That is, the frequency of the detection signal changes depending on the magnitude of the detected capacitance value. As such, in the frequency modulation scheme, detection of a capacitance value is performed using the fact that the frequency of the detection signal changes depending on the magnitude of the detected capacitance value.

Figure 5:
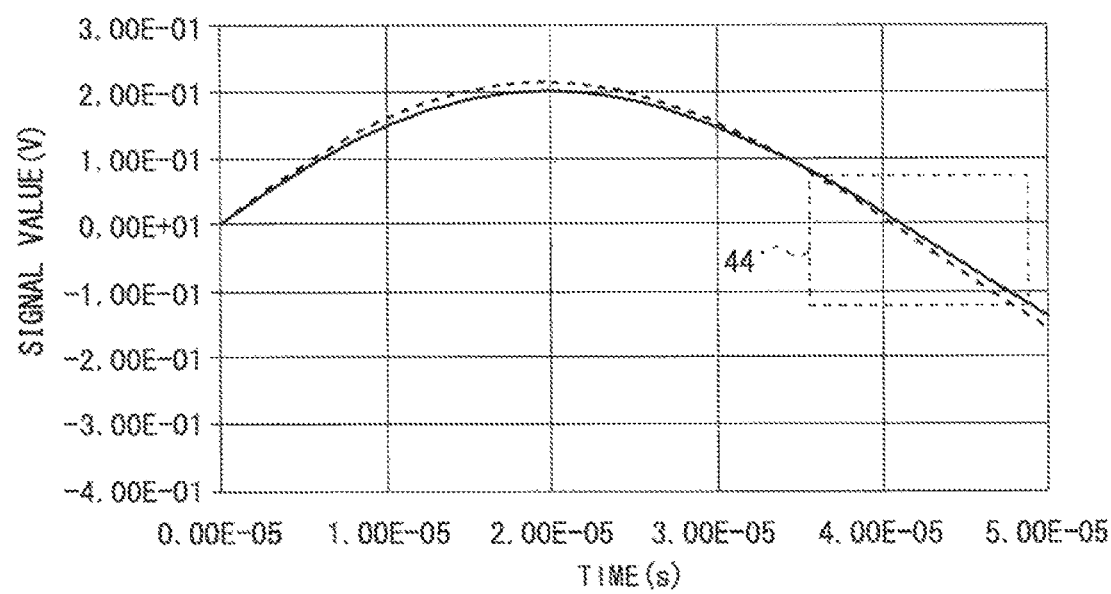
FIG. 5 is a signal waveform diagram showing waveforms of detection signals for when the drive frequency is 10 kHz, regarding simulation results.
Figure 6:
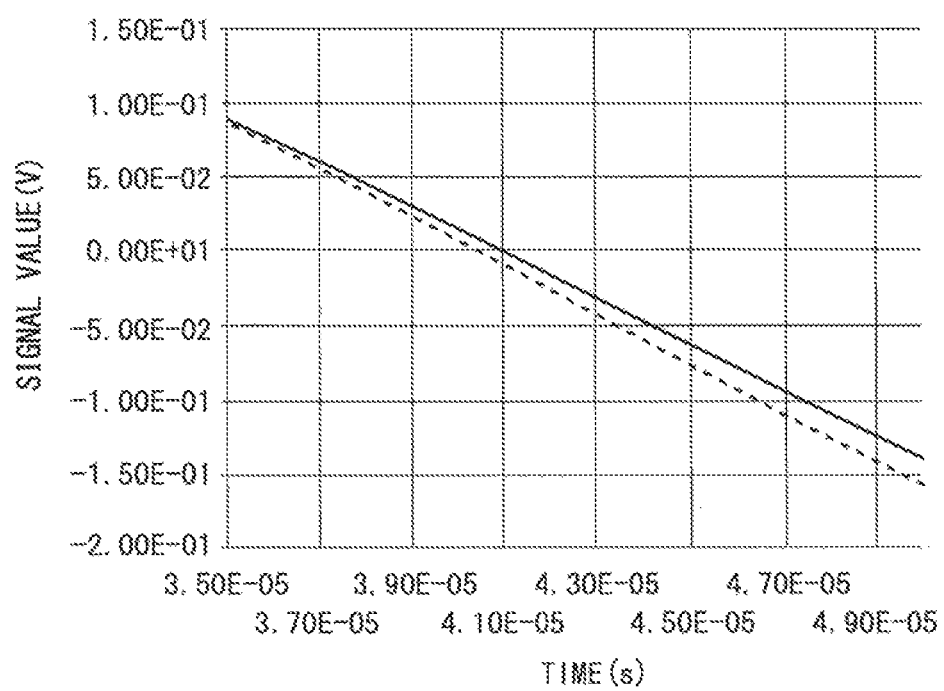
FIG. 6 is an enlarged view of a portion indicated by reference character 44 in FIG. 5, regarding the simulation results.
Figure 7:
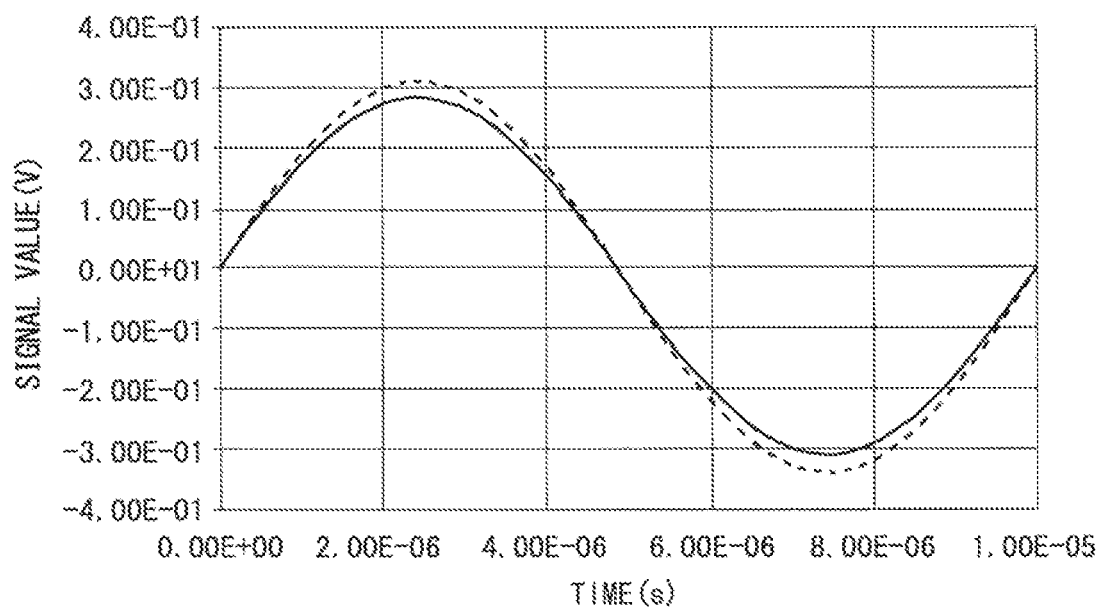
FIG. 7 is a signal waveform diagram showing waveforms of detection signals for when the drive frequency is 100 kHz, regarding simulation results.

In addition, as a characteristic for when the frequency modulation scheme is used under a high load environment in the built-in touch sensor type display device, etc., it is known that when a high frequency band is used for driving the touch panel, the amount of change in the frequency of the detection signal decreases, reducing detection accuracy. Simulation results regarding this are shown in FIGS. 5 to 7. FIG. 5 shows waveforms of detection signals for when the drive frequency is 10 kHz, FIG. 6 is an enlarged view of a portion indicated by reference character 44 in FIG. 5, and FIG. 7 shows waveforms of detection signals for when the drive frequency is 100 kHz. Note that in FIGS. 5 to 7, waveforms of detection signals obtained when a touch on the touch panel is performed are represented by solid lines, and waveforms of detection signals obtained when a touch on the touch panel is not performed are represented by dotted lines. It can be grasped from FIGS. 5 to 7 that when the drive frequency is 10 kHz, an amount of change in phase that can be sufficiently detected is obtained, whereas when the drive frequency is 100 kHz, the amount of change in phase is so small that it is difficult to detect the amount of change in phase. As such, in the frequency modulation scheme, when high-speed driving of the touch panel is performed, detection accuracy decreases. Note that in the frequency modulation scheme, a value corresponding to the amount of change in the phase of the detection signal is obtained as a detected value for determining whether there is a touch. A detected value obtained using the frequency modulation scheme may be hereinafter referred to as "second detected value".

Figure 8:
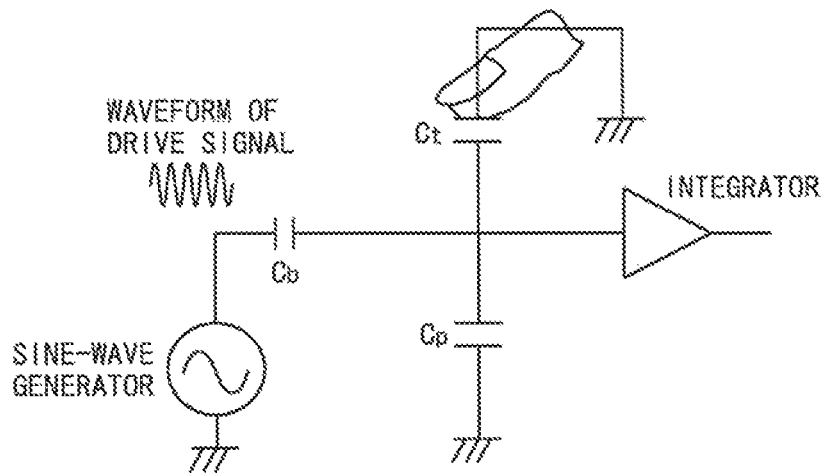
FIG. 8 is a diagram showing an example of an equivalent circuit model of a touch panel.

Now, the fact that detection accuracy decreases when high-speed driving is performed in the frequency modulation scheme will be specifically described. FIG. 8 is a diagram showing an example of an equivalent circuit model of a touch panel. In FIG. 8, a circuit internal capacitance is represented by reference character $C_b$, a parasitic capacitance is represented by reference character $C_p$, and a touch capacitance (a capacitance generated when a touch is performed with a finger) is represented by reference character $C_t$. A detected capacitance C for when a touch is not performed is represented by the following equation (1), and a detected capacitance C' for when a touch is performed is represented by the following equation (2):

[Expression 1]

$$C = \frac{1}{\frac{1}{C_b} + \frac{1}{C_p}} = \frac{C_b C_p}{C_b + C_p} \quad (1)$$

[Expression 2]

$$C' = \frac{1}{\frac{1}{C_b} + \frac{1}{C_p + C_t}} = \frac{C_b(C_p + C_t)}{C_b + C_p + C_t} \quad (2)$$

Note, however, that upon calculating the amount of change in phase, the wiring line resistance of the touch panel needs to be considered. Meanwhile, although an equivalent circuit model for when the mutual capacitance scheme is adopted differs from an equivalent circuit model for when the self-capacitance scheme is adopted, the same concept can be used for both models when considering the amount of change in phase.

Figure 9:
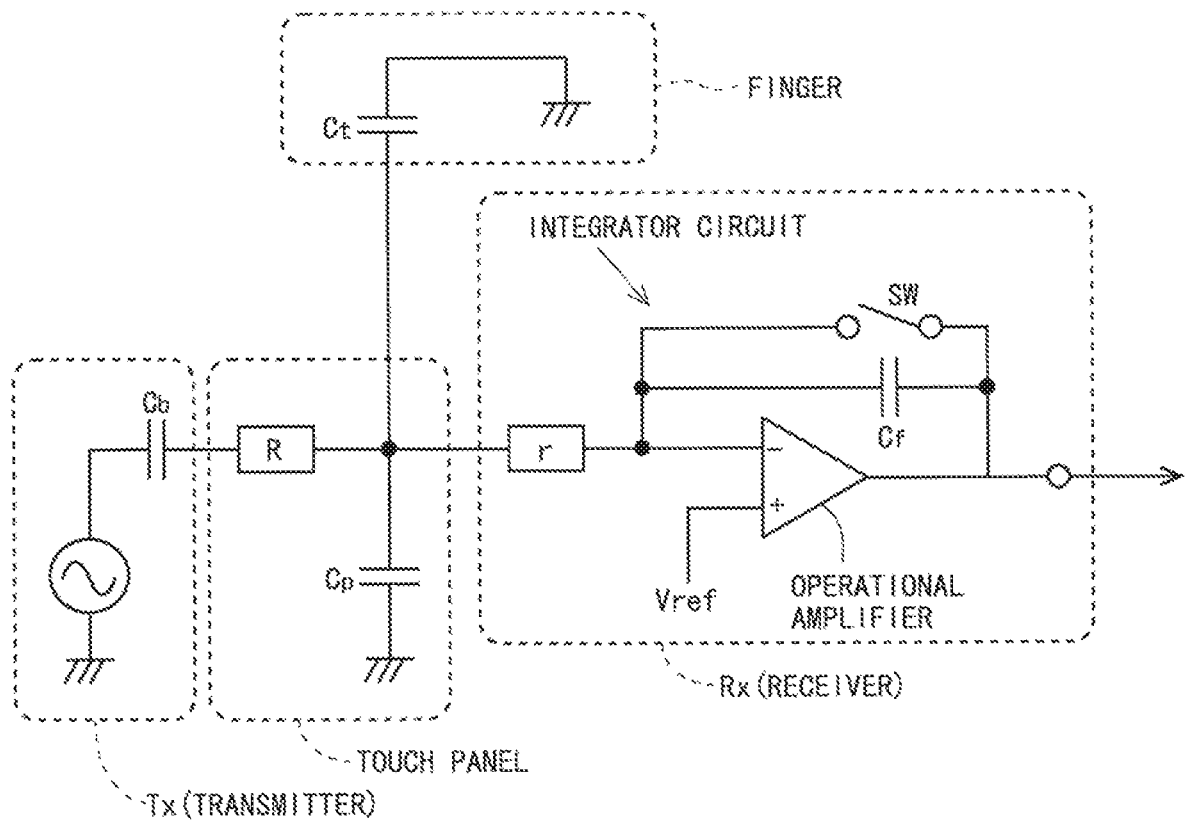
FIG. 9 is a diagram showing an example of an equivalent circuit model for when a mutual capacitance scheme is adopted.

FIG. 9 is a diagram showing an example of an equivalent circuit model for when the mutual capacitance scheme is adopted. When the mutual capacitance scheme is adopted, as shown in FIG. 9, a portion that functions as a transmitter and a portion that functions as a receiver are provided. In the receiver, an integrator circuit including an operational amplifier, a capacitor $C_f$, and a switch SW is formed, and a circuit internal resistance r is also present. However, when the wiring line resistance R of the touch panel is significantly larger than the circuit internal resistance r, the circuit internal resistance r can be ignored upon calculation of the amount of change in phase.

Figure 10:
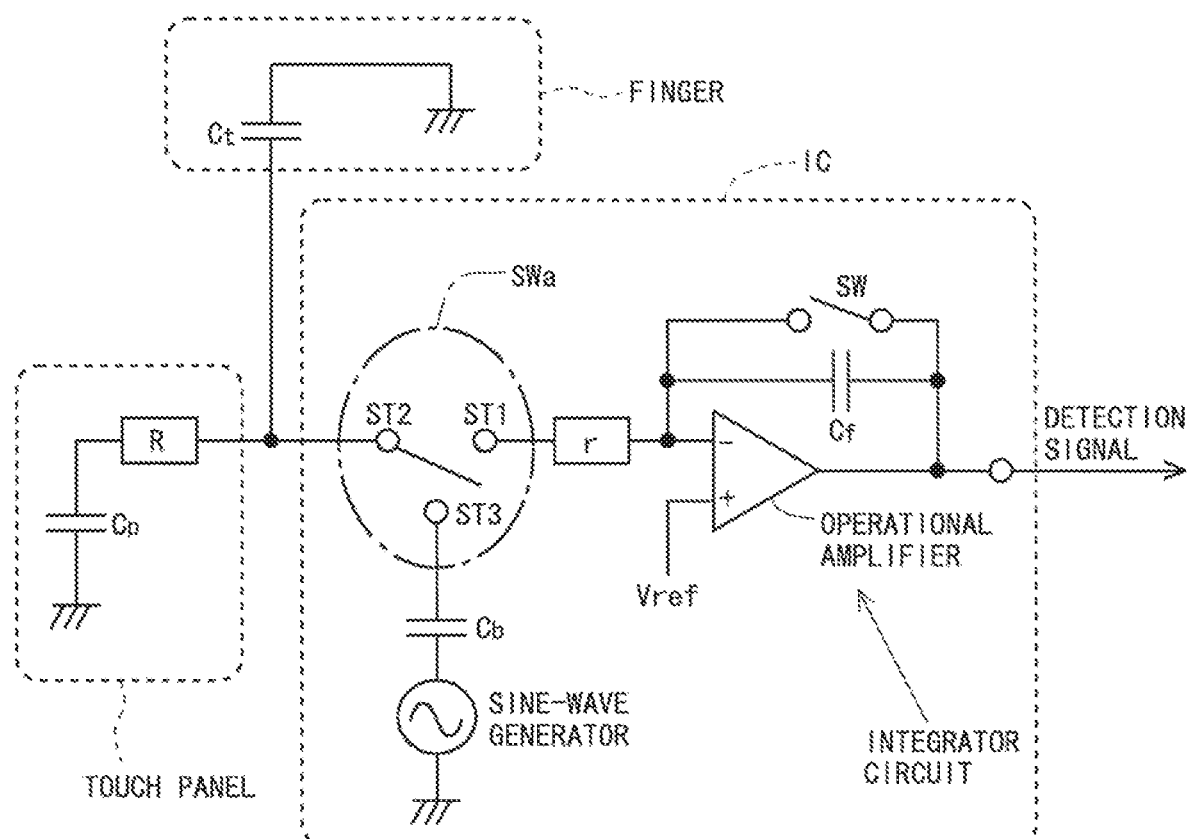
FIG. 10 is a diagram showing an example of an equivalent circuit model for when a self-capacitance scheme is adopted.

FIG. 10 is a diagram showing an example of an equivalent circuit model for when the self-capacitance scheme is adopted. In this configuration, in an IC, an integrator circuit is provided as with the configuration shown in FIG. 9. In addition, regarding a switch given reference character SWa, a terminal ST2 is connected to a terminal ST3 when a parasitic capacitance $C_p$ in a touch panel is charged, and the terminal ST2 is connected to a terminal ST1 when electric charge charged in the parasitic capacitance $C_p$ in the touch panel is provided to the integrator circuit. In this IC, too, a circuit internal resistance r is present. However, when the wiring line resistance R of the touch panel is significantly larger than the circuit internal resistance r, the circuit internal resistance r can be ignored upon calculation of the amount of change in phase.

Figure 11:
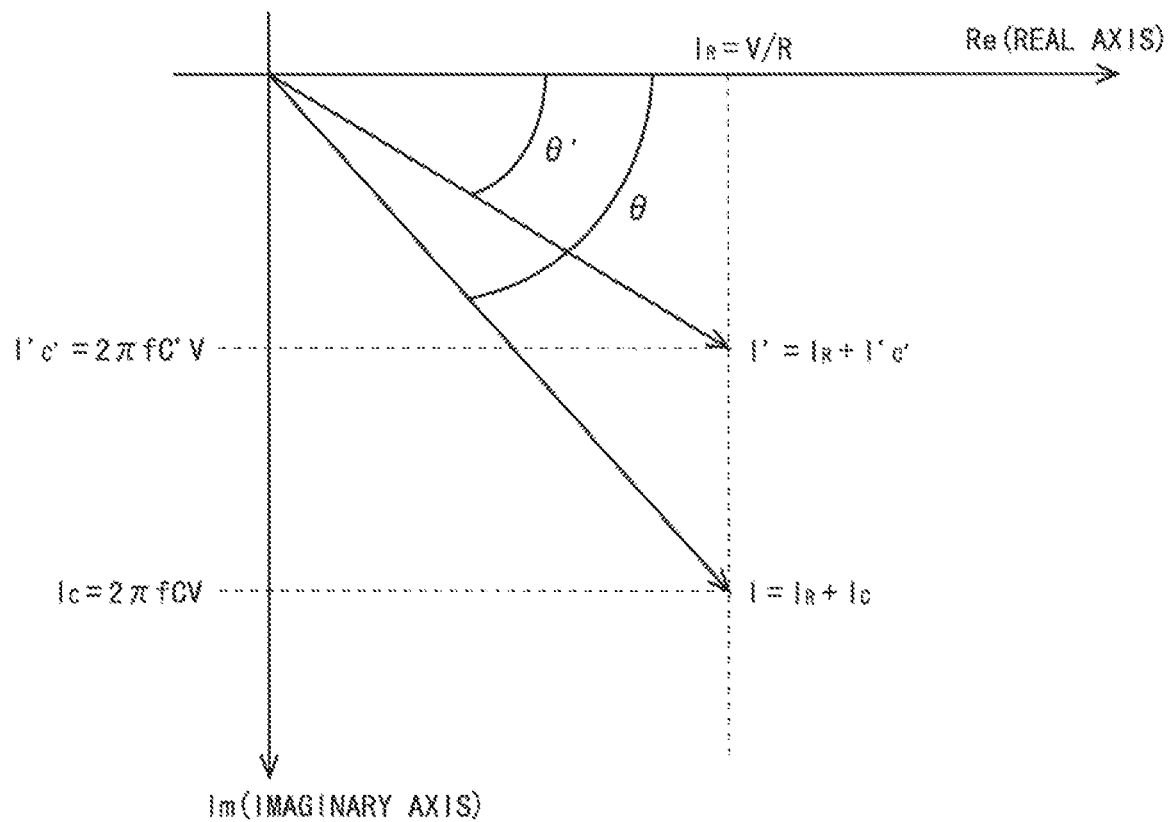
FIG. 11 is a diagram for describing the amount of change in phase.
Figure 12:
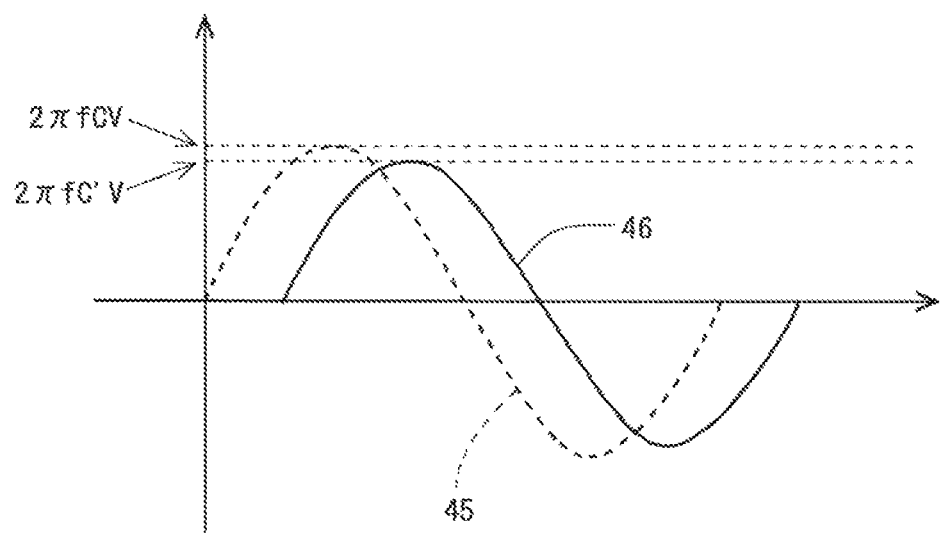
FIG. 12 is a signal waveform diagram showing waveforms of detection signals for when a touch is not performed and for when a touch is performed.

With reference to FIG. 11, the amount of change in phase is discussed using a concept by the use of a complex number. When the voltage is V and the wiring line resistance is R, a current $I_R$ for a real axis is V/R. When the drive frequency is f, a current $I_C$ for an imaginary axis obtained when a touch is not performed is $2\pi fCV$, and a current $I'_C$ for the imaginary axis obtained when a touch is performed is $2\pi fC'V$. Note that C is shown in the above equation (1), and C' is shown in the above equation (2). From the above, a current I obtained when a touch is not performed is represented as "$I_R + I_C$", and a current I' obtained when a touch is performed is represented as "$I_R + I'c$,". As can be grasped from FIG. 11, a difference occurs between a phase θ obtained when a touch is not performed and a phase θ' obtained when a touch is performed. That is, an amount of change in phase occurs. Regarding this, in FIG. 12, a waveform of a detection signal obtained when a touch is not performed is represented by a dotted line given reference character 45, and a waveform of a detection signal obtained when a touch is performed is represented by a solid line given reference character 46.

As can be grasped from FIG. 11, the following equation (3) is satisfied when a touch is not performed, and the following equation (4) is satisfied when a touch is performed:

[Expression 3]

$$\tan\theta = \frac{2\pi fCV}{\frac{V}{R}} = 2\pi fCR \quad (3)$$

[Expression 4]

$$\tan\theta' = \frac{2\pi fC'V}{\frac{V}{R}} = 2\pi fC'R \quad (4)$$

Since the following equation (5) is satisfied from the above equation (3) and the following equation (6) is satisfied from the above equation (4), the amount of change in phase θ-θ' is represented by the following equation (7):

[Expression 5]

$$\theta = \tan^{-1}(2\pi fCR) \quad (5)$$

[Expression 6]

$$\theta' = \tan^{-1}(2\pi fC'R) \quad (6)$$

[Expression 7]

$$\theta - \theta' = \tan^{-1}(2\pi fCR) - \tan^{-1}(2\pi fC'R) \quad (7)$$
$$= \tan^{-1}\frac{2\pi fCR + 2\pi fC'R}{1 + 2\pi fCR \times 2\pi fC'R}$$
$$= \tan^{-1}\frac{2\pi fR(C + C')}{1 + (2\pi fR)^2 \times C \times C'}$$

From the above equations (1), (2), and (7), conceivable methods for increasing the amount of change in phase include reducing the parasitic capacitance $C_p$, reducing the circuit internal capacitance $C_b$, and reducing the drive frequency f. Regarding this, the parasitic capacitance $C_p$ and the circuit internal capacitance $C_b$ cannot be easily changed. Therefore, in order to increase the amount of change in phase, the drive frequency f needs to be reduced. However, as can be grasped from FIG. 3, if the drive frequency f is reduced, then a sufficient amount of change (a difference between the amplitude of a detection signal obtained when a touch is performed and the amplitude of a detection signal obtained when a touch is not performed) may not be obtained in the amplitude modulation scheme.

From the above, it is difficult to perform touch detection using the amplitude modulation scheme and touch detection using the frequency modulation scheme, using drive signals of the same frequency band, under a high load environment in a display device including an in-cell type or on-cell type touch panel, etc. Hence, in the following embodiment, a drive signal with a relatively high frequency is used when touch detection using the amplitude modulation scheme is performed, and a drive signal with a relatively low frequency is used when touch detection using the frequency modulation scheme is performed.

Taking into account the above-described matters, an embodiment of the present invention will be described below with reference to the accompanying drawings.

<2. Overall Configuration and Overview of Operation>

Figure 1:
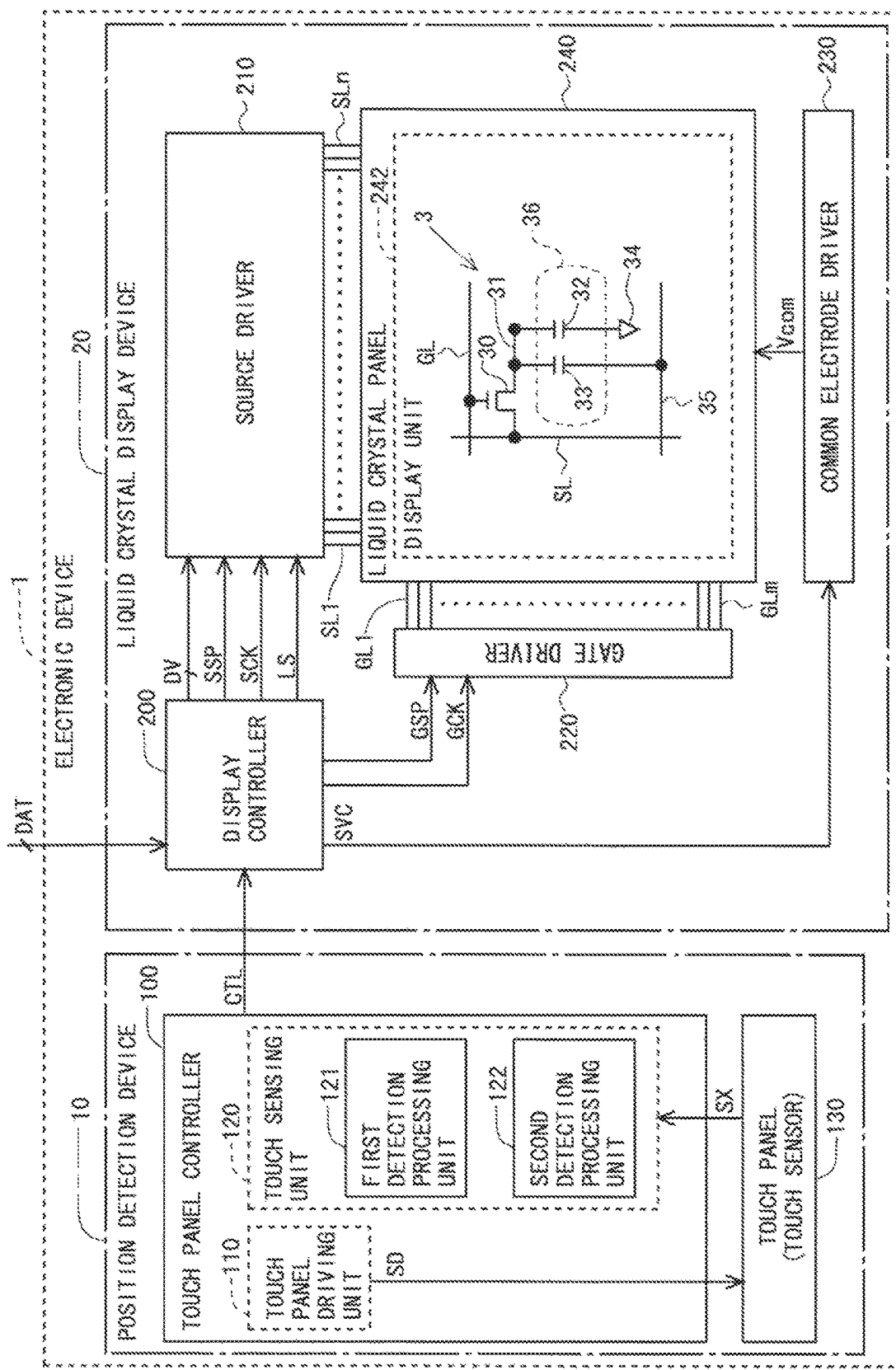
FIG. 1 is a block diagram for describing a functional configuration of an electronic device including a position detection device according to an embodiment of the present invention.

FIG. 1 is a block diagram for describing a functional configuration of an electronic device 1 including a position detection device 10 according to an embodiment of the present invention. The electronic device 1 is composed of the position detection device 10 and a liquid crystal display device 20. Note that FIG. 1 is a diagram showing the functional configuration and thus a positional relationship between components, etc., are different from actual ones.

The position detection device 10 is composed of a touch panel controller 100 and a touch panel (touch sensor) 130. The touch panel controller 100 includes a touch panel driving unit 110 and a touch sensing unit 120. The touch sensing unit 120 includes a first detection processing unit 121 and a second detection processing unit 122. Note that, in the present embodiment, a sensor driving unit is implemented by the touch panel driving unit 110, and a position detecting unit is implemented by the touch sensing unit 120.

The touch panel controller 100 controls the operation of the touch panel 130. At that time, the touch panel driving unit 110 provides a drive signal SD of a sine-wave for performing touch detection to the touch panel 130. The touch panel 130 detects a touch (more specifically, the contact or approach of the recognition object) with a recognition object such as a finger of a user (an operator of the electronic device 1) or a touch pen. Detection timing is determined based on the drive signal SD provided from the touch panel controller 100. The touch panel 130 provides a detection signal SX which is a result of detection to the touch panel controller 100. The touch sensing unit 120 detects a position where a touch on the touch panel 130 is performed, based on the detection signal SX obtained, depending on the drive signal SD, from the touch panel 130. At that time, depending on a period, the first detection processing unit 121 or the second detection processing unit 122 performs a touch detection process including a process of determining whether there is a touch on the touch panel 130. The first detection processing unit 121 performs the touch detection process using the amplitude modulation scheme, based on the detection signal SX outputted from the touch panel 130. The second detection processing unit 122 performs the touch detection process using the frequency modulation scheme, based on the detection signal SX outputted from the touch panel 130. When a touch position of the recognition object is identified by the touch sensing unit 120 in the above-described manner, a control signal CTL is provided from the touch panel controller 100 to a display controller 200 depending on the touch position.

Note that the touch panel driving unit 110 provides a drive signal SD with a relatively high frequency to the touch panel 130 during a period during which the touch detection process is to be performed by the first detection processing unit 121, i.e., a period during which the touch detection process using the amplitude modulation scheme is to be performed, and provides a drive signal SD with a relatively low frequency to the touch panel 130 during a period during which the touch detection process is to be performed by the second detection processing unit 122, i.e., a period during which the touch detection process using the frequency modulation scheme is to be performed.

The liquid crystal display device 20 includes the display controller 200, a source driver (video signal line drive circuit) 210, a gate driver (scanning signal line drive circuit) 220, a common electrode driver 230, and a liquid crystal panel 240. The liquid crystal panel 240 includes a display unit 242 that displays images. Note that a configuration in which at least one of the source driver 210, the gate driver 220, and the common electrode driver 230 is provided within the liquid crystal panel 240 (monolithic configuration) can also be adopted.

Regarding FIG. 1, the display unit 242 has a plurality of (n) source bus lines (video signal lines) SL1 to SLn and a plurality of (m) gate bus lines (scanning signal lines) GL1 to GLm disposed therein. Pixel formation portions 3 forming pixels are provided at respective intersections of the source bus lines SL1 to SLn and the gate bus lines GL1 to GLm. That is, the display unit 242 includes a plurality of (n×m) pixel formation portions 3. The plurality of pixel formation portions 3 are arranged in a matrix form, forming a pixel matrix of m rows×n columns. Each pixel formation portion 3 includes a TFT 30 which is a switching element connected at its gate terminal to a gate bus line GL passing through a corresponding intersection and connected at its source terminal to a source bus line SL passing through the intersection; a pixel electrode 31 connected to a drain terminal of the TFT 30; a common electrode 34 and an auxiliary capacitance electrode 35 which are provided so as to be shared by the plurality of pixel formation portions 3; a liquid crystal capacitance 32 formed by the pixel electrode 31 and the common electrode 34; and an auxiliary capacitance 33 formed by the pixel electrode 31 and the auxiliary capacitance electrode 35. A pixel capacitance 36 is formed by the liquid crystal capacitance 32 and the auxiliary capacitance 33. Note that in the display unit 242 in FIG. 1, only those components provided for one pixel formation portion 3 are shown.

Meanwhile, as the TFT 30 in the display unit 242, for example, a thin-film transistor using an oxide semiconductor for the semiconductor layers (an oxide semiconductor TFT) can be adopted. More specifically, a TFT whose channel layer is formed of In—Ga—Zn—O (indium gallium zinc oxide) which is an oxide semiconductor having indium (In), gallium (Ga), zinc (Zn), and oxygen (O) as main components (hereinafter, referred to as "IGZO-TFT") can be adopted as the TFT 30. Since the oxide semiconductor has high electron mobility, by using the oxide semiconductor TFT such as the IGZO-TFT, miniaturization of the TFT 30 becomes possible, and it is advantageous in terms of high definition and a high aperture ratio. In addition, since leakage current is reduced, it is advantageous in terms of low power consumption. Furthermore, the voltage holding ratio of the pixels is increased. Note that, for materials of the semiconductor layer of the thin-film transistor, various variations can be applied. In addition to the thin-film transistor using the oxide semiconductor for the semiconductor layer, for example, a thin-film transistor (a-Si TFT) using an amorphous silicon for the semiconductor layers, a thin-film transistor using a microcrystalline silicon for the semiconductor layer, a thin-film transistor (LTPS-TFT) using a low-temperature polycrystalline silicon for the semiconductor layer, etc., can also be adopted.

The display controller 200 receives image data DAT transmitted from an external source and a control signal CTL transmitted from the touch panel controller 100, and outputs digital video signals DV, a source start pulse signal SSP, a source clock signal SCK, and a latch strobe signal LS to the source driver 210, outputs a gate start pulse signal GSP and a gate clock signal GCK to the gate driver 220, and outputs a common electrode drive signal SVC to the common electrode driver 230.

The source driver 210 receives the digital video signals DV, the source start pulse signal SSP, the source clock signal SCK, and the latch strobe signal LS which are transmitted from the display controller 200, and applies driving video signals to the respective source bus lines SL. At this time, the source driver 210 sequentially holds the digital video signals DV indicating voltages to be applied to the respective source bus lines SL, at timing at which pulses of the source clock signal SCK are generated. Then, the held digital video signals DV are converted into analog voltages at timing at which a pulse of the latch strobe signal LS is generated. The converted analog voltages are simultaneously applied, as driving video signals, to all source bus lines SL1 to SLn.

The gate driver 220 repeats the application of an active scanning signal to respective gate bus lines GL with one vertical scanning period as a cycle, based on the gate start pulse signal GSP and the gate clock signal GCK which are transmitted from the display controller 200.

The common electrode driver 230 applies a predetermined voltage Vcom to the common electrode 34, based on the common electrode drive signal SVC transmitted from the display controller 200.

In the above-described manner, the driving video signals are applied to the source bus lines SL1 to SLn, the scanning signals are applied to the gate bus lines GL1 to GLm, and the predetermined voltage Vcom is applied to the common electrode 34, by which an image based on the image data DAT transmitted from the external source is displayed on the display unit 242. In addition, when a touch on the touch panel 130 is detected by the touch sensing unit 120 in the touch panel controller 100, a process corresponding to a touch position is performed by the electronic device 1.

<3. Configuration of the Touch Panel and Overview of Position Detection>

Figure 13:
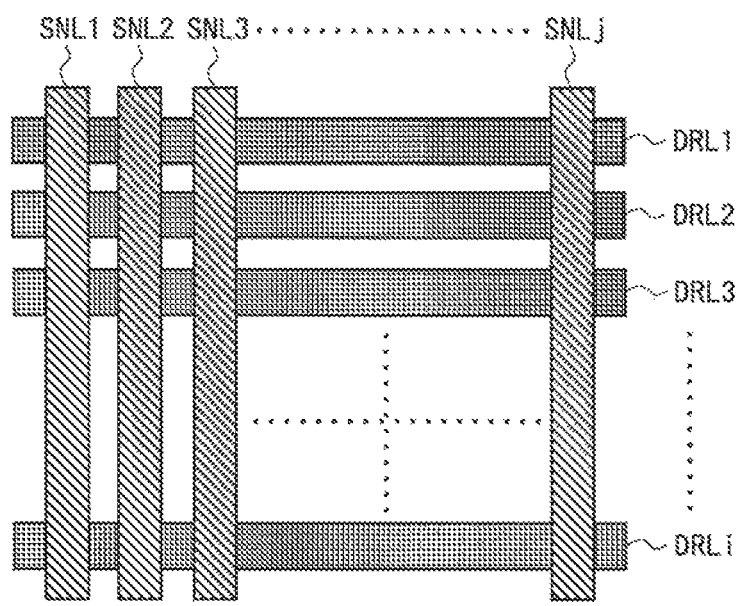
FIG. 13 is a diagram for describing a configuration of the touch panel in the above-described embodiment.

FIG. 13 is a diagram for describing a configuration of the touch panel 130. Note that the configuration of the touch panel 130 described here is an example and other configurations can also be adopted. In the present embodiment, the touch panel 130 has a plurality of electrodes for performing position detection (hereinafter, referred to as "position detection electrode group") formed in a region thereof corresponding to the display unit 242 of the liquid crystal display device 20. Specifically, as shown in FIG. 13, as the position detection electrode group, i drive lines DRL1 to DRLi and j sensing lines SNL1 to SNLj are disposed in the touch panel 130 such that they intersect each other.

In the present embodiment, position detection by a capacitive type is performed using the above-described position detection electrode group. As described above, as schemes for position detection by the capacitive type, a self-capacitance scheme and a mutual capacitance scheme are known. When position detection is performed by the mutual capacitance scheme, the drive lines DRL1 to DRLi are driven one by one, with all sensing lines SNL1 to SNLj turned on. On the other hand, when a position detection is performed by the self-capacitance scheme, all drive lines DRL1 to DRLi and all sensing lines SNL1 to SNLj are simultaneously driven. Note that position detection may be performed using only the self-capacitance scheme, or position detection may be performed using only the mutual capacitance scheme, or position detection may be performed using both the self-capacitance scheme and the mutual capacitance scheme.

<4. Driving Timing of the Touch Panel>

Figure 14:
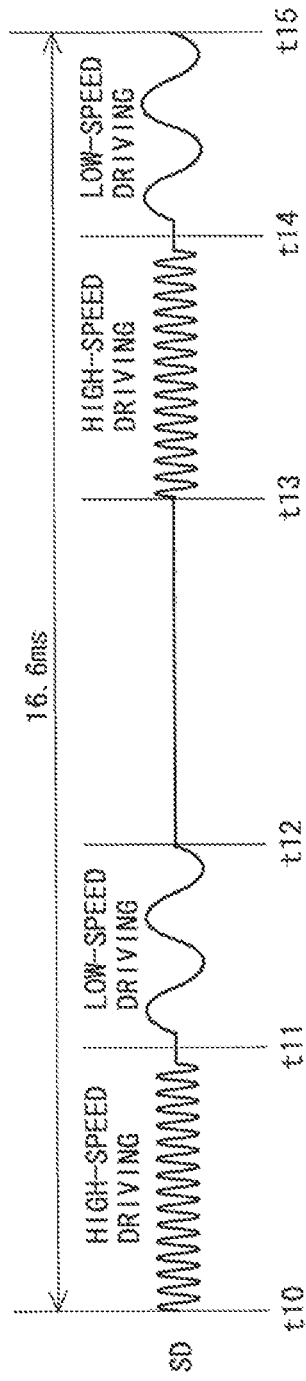
FIG. 14 is a signal waveform diagram for describing driving timing of the touch panel in the above-described embodiment.

Next, driving timing of the touch panel 130 will be described. FIG. 14 is a signal waveform diagram for describing driving timing of the touch panel 130 in the present embodiment. Note that, in the present embodiment, driving of the liquid crystal panel 240 and driving of the touch panel 130 are asynchronously performed. In an example shown in FIG. 14, in a certain frame period, a drive signal SD with a relatively high frequency is provided to the touch panel 130 during a period from time point t10 to time point t11 and a period from time point t13 to time point t14 (i.e., high-speed driving of the touch panel 130 is performed), and a drive signal SD with a relatively low frequency is provided to the touch panel 130 during a period from time point t11 to time point t12 and a period from time point t14 to time point t15 (i.e., low-speed driving of the touch panel 130 is performed). During the period from time point t10 to time point t11 and the period from time point t13 to time point t14, a touch detection process using the amplitude modulation scheme (i.e., a touch detection process by the first detection processing unit 121) is performed, and during the period from time point t11 to time point t12 and the period from time point t14 to time point t15, a touch detection process using the frequency modulation scheme (i.e., a touch detection process by the second detection processing unit 122) is performed. As such, the touch detection process is performed using an appropriate one of the amplitude modulation scheme and the frequency modulation scheme, depending on the time.

<4.1 Variants>

Meanwhile, regarding the touch detection process, the use of an appropriate one of the amplitude modulation scheme and the frequency modulation scheme (the use of an appropriate one of high-speed driving and low-speed driving) is not limited to the example shown in FIG. 14. Variants thereof will be described below.

<4.1.1 First Variant>

Figure 15:
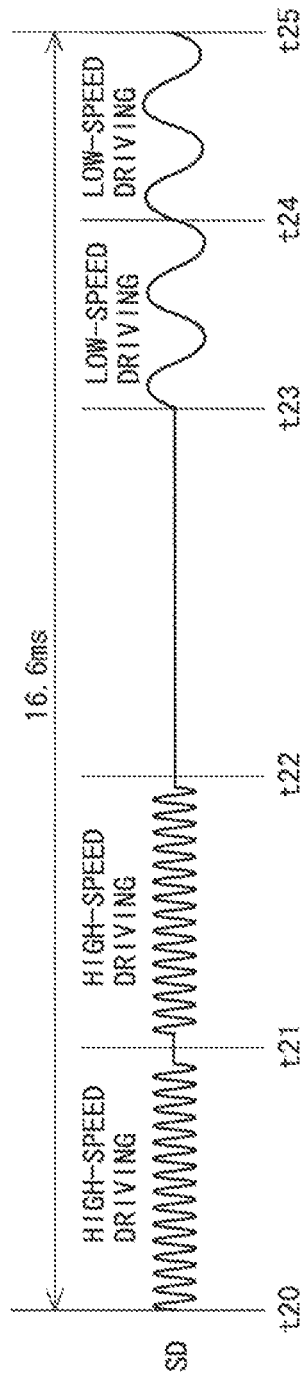
FIG. 15 is a signal waveform diagram for describing driving timing of the touch panel in a first variant.

FIG. 15 is a signal waveform diagram for describing driving timing of the touch panel 130 in a first variant. In the present variant, too, driving of the liquid crystal panel 240 and driving of the touch panel 130 are asynchronously performed. In an example shown in FIG. 15, in a certain frame period, a drive signal SD with a relatively high frequency is provided to the touch panel 130 during a period from time point t20 to time point t21 and a period from time point t21 to time point t22 (i.e., high-speed driving of the touch panel 130 is performed), and a drive signal SD with a relatively low frequency is provided to the touch panel 130 during a period from time point t23 to time point t24 and a period from time point t24 to time point t25 (i.e., low-speed driving of the touch panel 130 is performed). During the period from time point t20 to time point t21 and the period from time point t21 to time point t22, the touch detection process using the amplitude modulation scheme (i.e., the touch detection process by the first detection processing unit 121) is performed, and during the period from time point t23 to time point t24 and the period from time point t24 to time point t25, the touch detection process using the frequency modulation scheme (i.e., the touch detection process by the second detection processing unit 122) is performed. As such, in the present variant, the touch detection process using the amplitude modulation scheme is continuously performed during one period, and the touch detection process using the frequency modulation scheme is continuously performed during another period.

<4.1.2 Second Variant>

FIG. 16 is a signal waveform diagram for describing driving timing of the touch panel 130 in a second variant. In the present variant, driving of the liquid crystal panel 240 and driving of the touch panel 130 are synchronously performed. Hence, in the present variant, a drive synchronizing signal (e.g., a vertical synchronizing signal or a horizontal synchronizing signal) for synchronizing driving of the touch panel 130 to driving of the liquid crystal panel 240 is transmitted from the display controller 200 to the touch panel controller 100. Based on the drive synchronizing signal, one frame period is divided into, for example, as shown in FIG. 16, periods Ta for driving the liquid crystal panel 240 and periods Tb for driving the touch panel 130. Specifically, a vertical flyback period or a horizontal flyback period is assigned to the periods Tb for driving the touch panel 130. In an example shown in FIG. 16, a period from time point t31 to time point t32, a period from time point t33 to time point t34, a period from time point t36 to time point t37, and a period from time point t38 to time point t39 are the periods Tb for driving the touch panel 130. Regarding the periods Tb, during the period from time point t31 to time point t32 and the period from time point t33 to time point t34, a drive signal SD with a relatively high frequency is provided to the touch panel 130 (i.e., high-speed driving of the touch panel 130 is performed), and during the period from time point t36 to time point t37 and the period from time point t38 to time point t39, a drive signal SD with a relatively low frequency is provided to the touch panel 130 (i.e., low-speed driving of the touch panel 130 is performed). During the period from time point t31 to time point t32 and the period from time point t33 to time point t34, the touch detection process using the amplitude modulation scheme (i.e., the touch detection process by the first detection processing unit 121) is performed, and during the period from time point t36 to time point t37 and the period from time point t38 to time point t39, the touch detection process using the frequency modulation scheme (i.e., the touch detection process by the second detection processing unit 122) is performed. In the above-described manner, in the present variant, the touch detection process is performed during periods during which the liquid crystal panel 240 is not driven. Hence, the influence of display noise is suppressed.

<4.1.3 Third Variant>

FIG. 17 is a signal waveform diagram for describing driving timing of the touch panel 130 in a third variant. In the present variant, as in the second variant, driving of the liquid crystal panel 240 and driving of the touch panel 130 are synchronously performed. Hence, in the present variant, too, a drive synchronizing signal is transmitted from the display controller 200 to the touch panel controller 100. Based on the drive synchronizing signal, one frame period is divided into, for example, as shown in FIG. 17, a period Ta for driving the liquid crystal panel 240 and a period Tb for driving the touch panel 130. In an example shown in FIG. 17, a period from time point t41 to time point t43 is the period Tb for driving the touch panel 130. Regarding the period Tb, during a period from time point t41 to time point t42, a drive signal SD with a relatively high frequency is provided to the touch panel 130 (i.e., high-speed driving of the touch panel 130 is performed), and during a period from time point t42 to time point t43, a drive signal SD with a relatively low frequency is provided to the touch panel 130 (i.e., low-speed driving of the touch panel 130 is performed). During the period from time point t41 to time point t42, the touch detection process using the amplitude modulation scheme (i.e., the touch detection process by the first detection processing unit 121) is performed, and during the period from time point t42 to time point t43, the touch detection process using the frequency modulation scheme (i.e., the touch detection process by the second detection processing unit 122) is performed.

<4.2 Summary of Driving Timing of the Touch Panel>

As described above, during an operating period of the electronic device 1, a period during which the touch detection process is performed by the first detection processing unit 121 (first detection processing period) and a period during which the touch detection process is performed by the second detection processing unit 122 (second detection processing period) are provided. Driving of the touch panel 130 may be performed asynchronously with driving of the liquid crystal panel 240, or may be performed synchronously with driving of the liquid crystal panel 240. In addition, as long as the touch detection process using the amplitude modulation scheme and the touch detection process using the frequency modulation scheme are performed separately depending on the time, the touch detection process using the amplitude modulation scheme and the touch detection process using the frequency modulation scheme may be alternately performed, or touch detection processes of each scheme may be continuously and collectively performed. Note that, as means for separating the touch detection process using the amplitude modulation scheme and the touch detection process using the frequency modulation scheme depending on the time, for example, a timer is provided in the touch panel controller 100 so that each process can be performed at predetermining timing.

<5. Specific Exemplary Applications and Effects>

As described above, according to the present embodiment, the position detection device 10 performs the touch detection process using the amplitude modulation scheme and the touch detection process using the frequency modulation scheme. Therefore, as results of the touch detection processes, two types of detection results (a detection result based on the amplitude modulation scheme and a detection result based on the frequency modulation scheme) are obtained. By determining whether there is a touch at each location and identifying a touch position based on the two types of detection results, various effects can be obtained. Hence, specific exemplary applications for providing various effects will be described below.

<5.1 First Exemplary Application>

First, an example will be described in which a combination of the touch detection process using the amplitude modulation scheme and the touch detection process using the frequency modulation scheme is applied to coping with noise. According to the amplitude modulation scheme, the largest amplitude change in the detection signal is obtained at an optimal drive frequency. That is, the above-described first detected value becomes largest at an optimal drive frequency (see FIG. 3). The optimal drive frequency is a relatively high frequency. As such, the amplitude modulation scheme has an advantage in that high-speed driving of the touch panel 130 is possible even under a high load environment. Therefore, according to the amplitude modulation scheme, the number of sampling can be increased by performing high-speed driving. FIG. 18 is a graph showing a relationship between the number of sampling and noise. In addition, FIG. 19 is a table showing a relationship between the number of sampling and noise. It can be grasped from FIGS. 18 and 19 that noise decreases as the number of sampling increases. A reason that noise thus decreases is because noise data is averaged when the number of sampling increases. In regard to random noise, when the number of sampling is increased by a factor of N, the noise level is reduced by a factor of $(1/\sqrt{N})$. From the above, according to the amplitude modulation scheme, since the number of sampling can be increased, it becomes possible to reduce noise. Note that, in order to effectively reduce noise, the touch panel driving unit 110 provides a drive signal SD with a frequency of, for example, 100 kHz or more to the touch panel 130 during a period during which the touch detection process using the amplitude modulation scheme is performed.

Meanwhile, noise resulting from driving of the display device and noise received from an external source e.g., AC, charger noise of a power supply and light source noise) include many noise components in a relatively low frequency band (specifically, a frequency band lower than or equal to 100 kHz). Therefore, if the frequency of the drive signal SD is set to 100 kHz or less, it is easily affected by band noise. On the other hand, when the frequency of the drive signal SD is set to 100 kHz or more as described above, in addition to being able to obtain a noise reduction effect which is brought about by an increase in the number of samplings, an effect that the influence of band noise is suppressed can also be obtained. In addition, since it is easily affected by noise as a characteristic of the amplitude modulation scheme during a first detection processing period (a period during which the touch detection process is performed by the first detection processing unit 121), noise countermeasures during this period are important. Also in terms of this, it is preferred to set the frequency of the drive signal SD to 100 kHz or more so as not to be affected by band noise.

Figure 20:
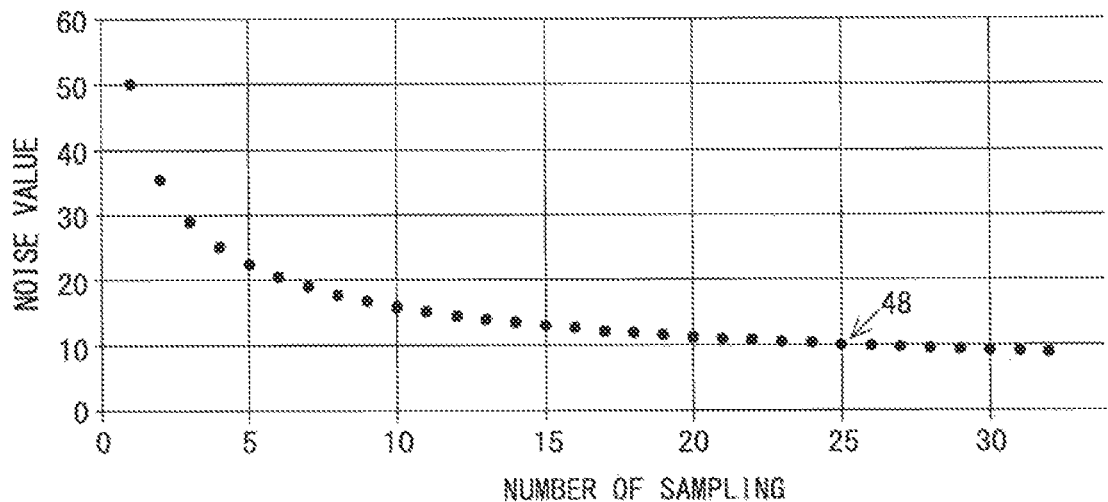
FIG. 20 is a graph for describing that a noise value decreases with an increase in the number of sampling.
Figure 21:
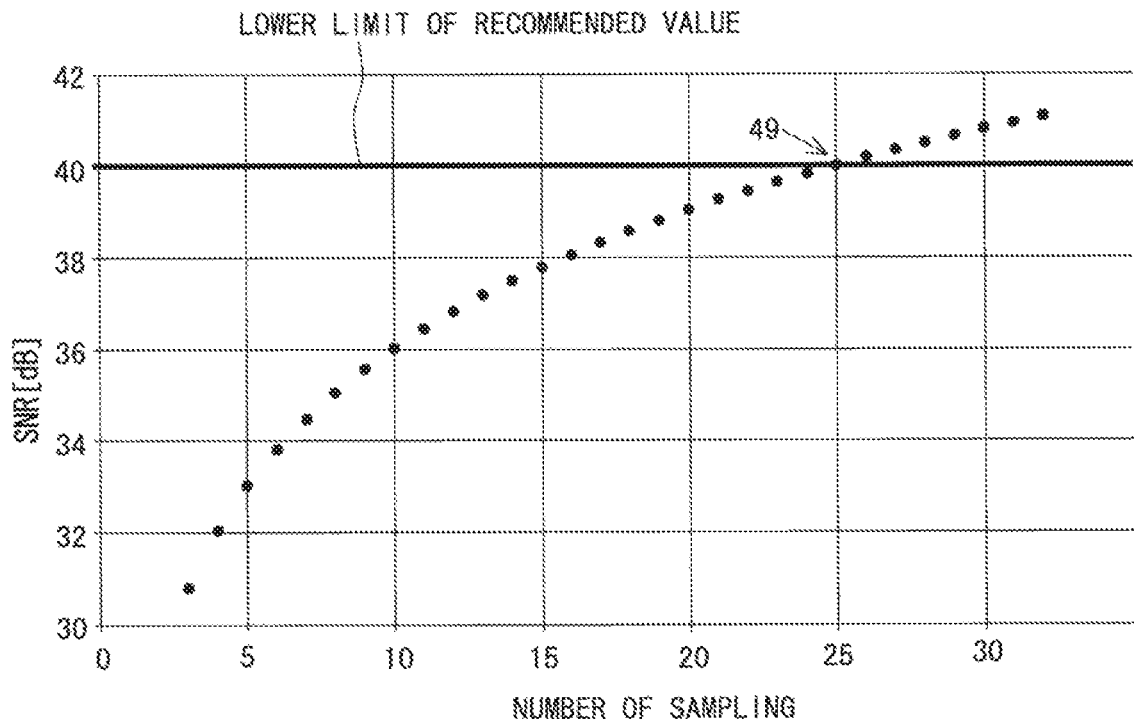
FIG. 21 is a graph for describing that SNR increases with an increase in the number of sampling.

In addition, the frequency of the drive signal SD for a period during which the touch detection process using the amplitude modulation scheme is performed may be determined taking into account SNR (SN ratio), which will be described below. As is known, the SNR is defined as "20 log (signal value/noise value)". Note that log is the common logarithm. In general, it is recommended that the SNR be set to 40 dB (decibel) or more. As can be grasped from the definition of the SNR, when "signal value: noise value=100: 1" is satisfied, the SNR is 40 dB. If the signal value is 1000, then the SNR is 40 dB when the noise value is 10. Therefore, if the noise value is 50 when the signal value is 1000, the number of sampling needs to be determined such that the noise value reaches 10 or less. Regarding this example, since the noise level is reduced by a factor of $(1/\sqrt{N})$ when the number of sampling is increased by a factor of N as described above, theoretically, the noise value decreases with the increase in the number of sampling as shown in FIG. 20. In addition, theoretically, the SNR increases with the increase in the number of sampling as shown in FIG. 21. Accordingly, in this example, when the number of sampling is set to 25, the noise value reaches 10 (see a portion indicated by an arrow with reference character 48 in FIG. 20) and the SNR reaches 40 dB (see a portion indicated by an arrow with reference character 49 in FIG. 21).

Considering the fact that the noise level is reduced by a factor of $(1/\sqrt{N})$ when the number of sampling is increased by a factor of N and that the SNR is 40 dB when "signal value: noise value=100:1" is satisfied, it is preferred to set the frequency of the drive signal SD used during the first detection processing period such that the number of sampling Scnt satisfies the following equation (8). Note that Vs is the signal value of the detection signal SX and Vn is the noise value.

[Expression 8]

$$Scnt \geq \left(100 \times \frac{Vn}{Vs}\right)^2 \quad (8)$$

In the above equation (8), when 1000 is substituted for Vs and 50 is substituted for Vn, "Scnt≥25" is obtained. That is, in the above-described example, it is preferred to set the frequency of the drive signal SD used during the first detection processing period such that the number of sampling is 25 or more.

Figure 22:
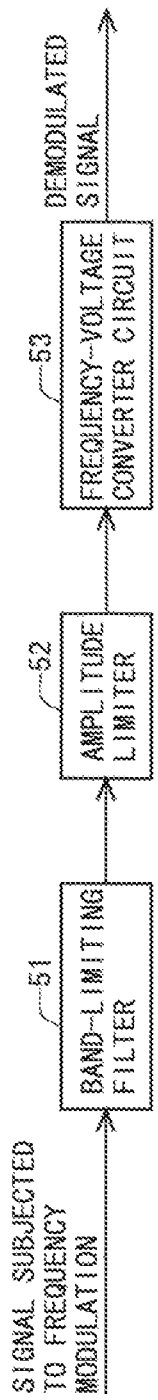
FIG. 22 is a block diagram showing a configuration for demodulating a signal having been subjected to frequency modulation (modulated signal), regarding the frequency modulation scheme.

As described above, according to the amplitude modulation scheme, it becomes possible to reduce noise. By combining the amplitude modulation scheme with the frequency modulation scheme, the resistance to noise can be further increased as described below. Regarding this, the frequency modulation scheme is conventionally used in various fields, and a configuration for demodulating a signal having been subjected to frequency modulation (modulated signal) includes, for example, a configuration shown in FIG. 22. According to the configuration shown in FIG. 22, first, a band-limiting filter 51 extracts only frequency components in a desired band from frequency components included in the modulated signal. In addition, since an amplitude limiter 52 is provided, even when noise in an amplitude direction is superimposed on the modulated signal, a portion corresponding to a change in amplitude is ignored and only desired frequency components are extracted. That is, the amplitude of an output from the band-limiting filter 51 becomes constant by passing through the amplitude limiter 52. Then, by providing an output from the amplitude limiter 52 to a frequency-voltage converter circuit 53, a demodulated signal is obtained. In this manner, the demodulated signal having high resistance to noise can be obtained.

From the above, by combining the amplitude modulation scheme with the frequency modulation scheme, it becomes possible to effectively eliminate the influence of noise. For example, in a case in which it cannot be determined, by the amplitude modulation scheme, whether there is a touch because of large noise, when a change in frequency is detected by the frequency modulation scheme, it can be determined that a touch on the touch panel 130 is performed, and when a change in frequency is not detected by the frequency modulation scheme, it can be determined that a touch on the touch panel 130 is not performed. As above, it becomes possible to accurately detect a touch position while preventing erroneous detection even under an environment that is susceptible to noise.

<5.2 Second Exemplary Application>

Figure 23:
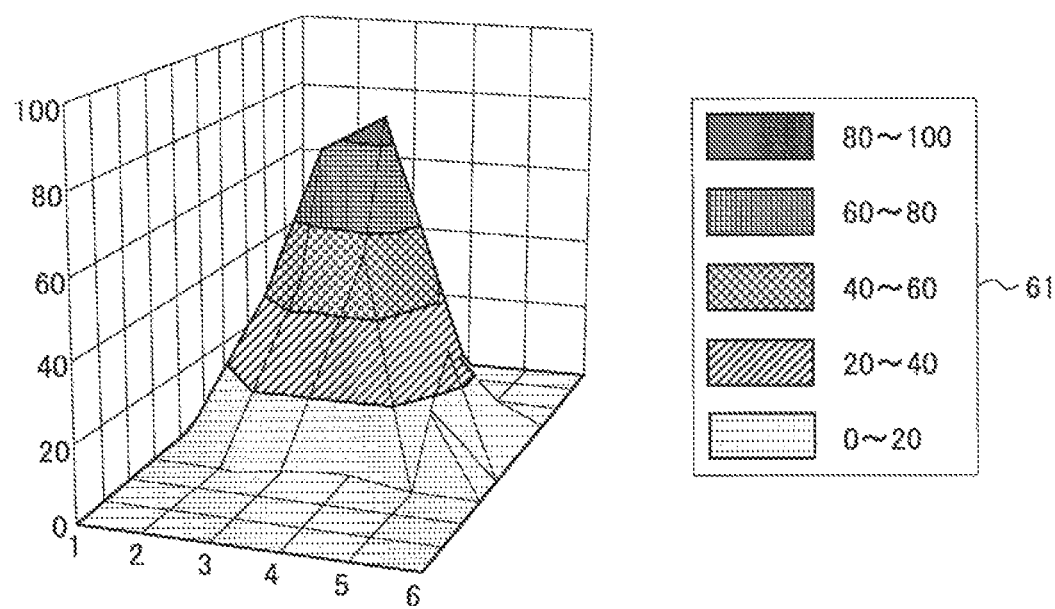
FIG. 23 is a diagram schematically showing detected values in a certain range which are obtained by a touch detection process using the amplitude modulation scheme when a touch is performed using a given glove.
Figure 24:
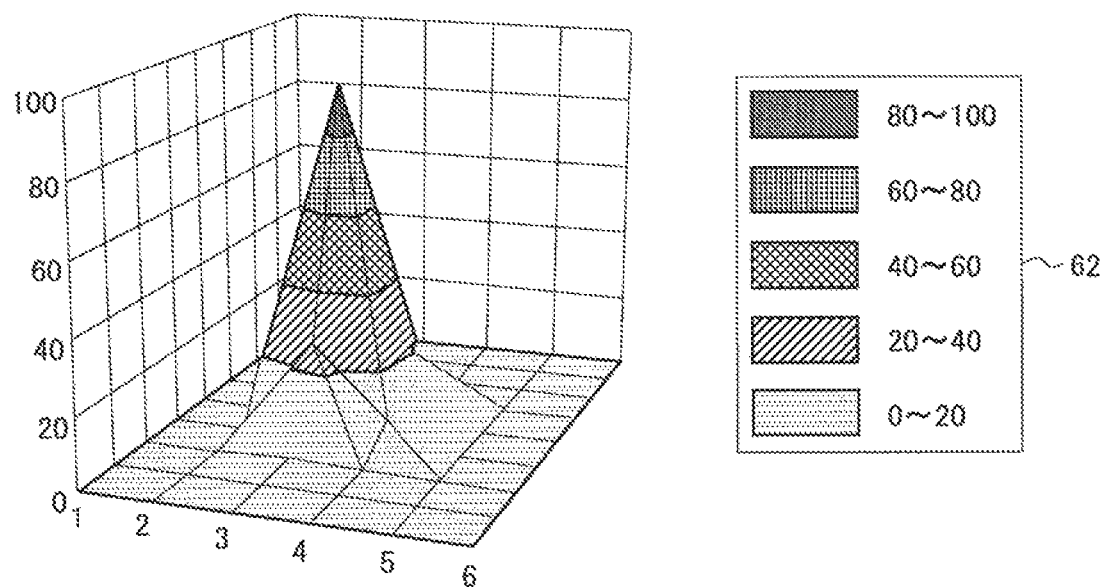
FIG. 24 is a diagram schematically showing detected values in a certain range which are obtained by a touch detection process using the amplitude modulation scheme when a touch is performed using a given conductive pen.

Next, an example will be described in which a combination of the touch detection process using the amplitude modulation scheme and the touch detection process using the frequency modulation scheme is applied to an improvement of the resolution levels of a detected value. FIG. 23 is a diagram schematically showing detected values (first detected values) in a certain range which are obtained by the touch detection process using the amplitude modulation scheme when a touch is performed using a given glove. FIG. 24 is a diagram schematically showing detected values (first detected values) in a certain range which are obtained by the touch detection process using the amplitude modulation scheme when a touch is performed using a given conductive pen. Note that in FIG. 23 a legend is shown in a box given reference character 61, and in FIG. 24 a legend is shown in a box given reference character 62. It can be grasped from FIGS. 23 and 24 that a range in which low detected values are obtained (bottom range) is wider for when the glove is used than for when the conductive pen is used. Due to such a fact, conventionally, a recognition object is identified based on the areas of the bottom ranges in FIGS. 23 and 24. However, as shown in FIG. 25, there are various types of gloves. Hence, depending on the type of glove, it may be difficult to distinguish between the conductive pen and the glove. That is, in a case in which the identification is performed based on the above-described areas, there is a possibility of the occurrence of erroneous detection.

Figure 26:
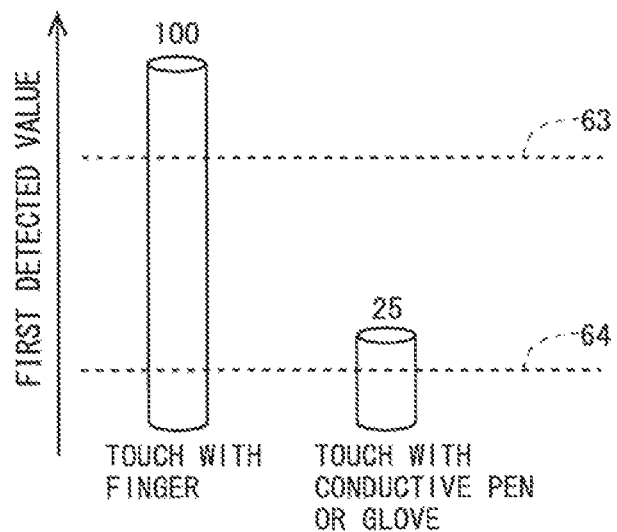
FIG. 26 is a diagram for describing threshold values used when a touch detection process using the amplitude modulation scheme is performed, regarding a second exemplary application of the above-described embodiment.
Figure 27:
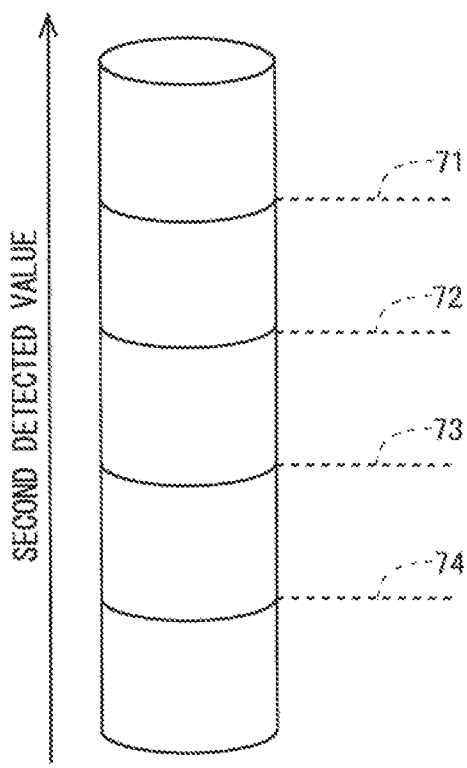
FIG. 27 is a diagram for describing threshold values used when a touch detection process using the frequency modulation scheme is performed, regarding the second exemplary application of the above-described embodiment.

Hence, in order to prevent the occurrence of erroneous detection such as that described above, the resolution of a detected value (second detected value) obtained when the touch detection process using the frequency modulation scheme is performed is preferably increased in the following manner, for example. First, using the amplitude modulation scheme, a detected value (first detected value) is compared with two threshold values 63 and 64 such as those schematically shown in FIG. 26. By this, it is determined that a touch with a finger is performed or it is determined that a touch with a conductive pen or a glove is performed. Furthermore, using the frequency modulation scheme, a detected value (second detected value) is compared with four threshold values 71 to 74 such as those schematically shown in FIG. 27. When the detected value is greater than the threshold value 71, it is determined that a touch with a glove using a high dielectric material (nylon, cotton, etc.) is performed. When the detected value is less than or equal to the threshold value 71 and greater than the threshold value 72, it is determined that a touch with a glove using a low dielectric material (rubber, polyethylene, etc.) is performed. When the detected value is less than or equal to the threshold value 72 and greater than the threshold value 73, it is determined that a touch with a conductive pen using a high dielectric material (barium titanate, etc.) is performed. When the detected value is less than or equal to the threshold value 73 and greater than the threshold value 74, it is determined that a touch with a conductive pen using a low dielectric material (polyacetal, etc.) is performed. By thus increasing the resolution of the detected value obtained when the touch detection process using the frequency modulation scheme is performed, it becomes possible to more finely identify the recognition object, e.g., to identify the material of the glove. In addition, since a distinction between, for example, a conductive pen and a glove is accurately made, the occurrence of erroneous detection is prevented.

<5.3 Third Exemplary Application>

Figure 28:
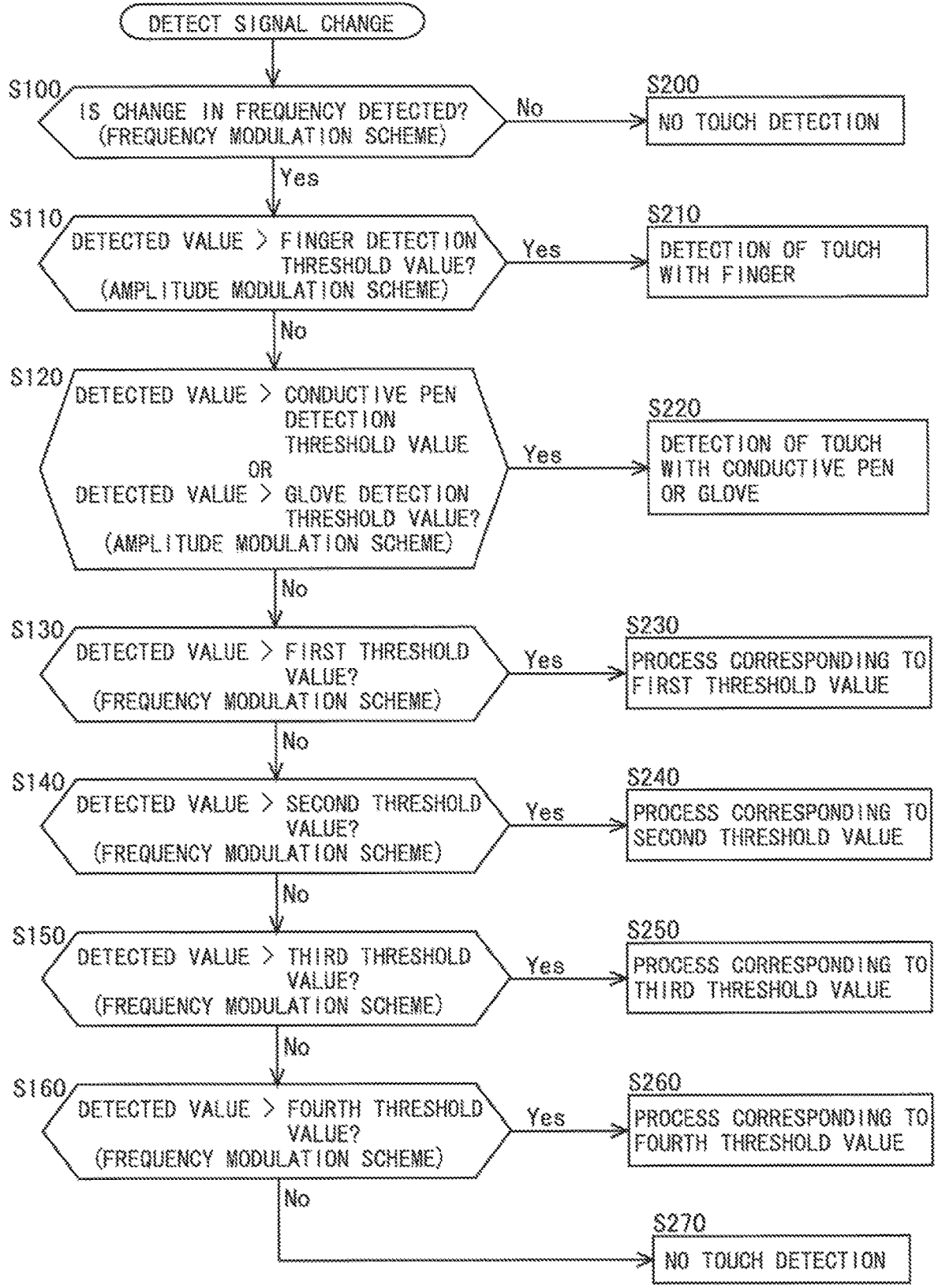
FIG. 28 is a flowchart showing an example of a procedure of a touch detection process in which the amplitude modulation scheme is combined with the frequency modulation scheme, regarding a third exemplary application of the above-described embodiment.

In addition, though it is related to the above-described second exemplary application, by combining the amplitude modulation scheme with the frequency modulation scheme, it becomes possible to increase identification sensitivity to a weak signal. How it becomes possible to increase identification sensitivity to a weak signal will be described below with reference to FIG. 28. FIG. 28 is a flowchart showing an example of a procedure of a touch detection process in which the amplitude modulation scheme is combined with the frequency modulation scheme.

In this example, when a signal change (a change in the amplitude of a detection signal SX) is detected by the amplitude modulation scheme, first, it is determined, using the frequency modulation scheme, whether there is a change in the frequency of the detection signal SX (step S100). If, as a result, a change in frequency is detected, then processing proceeds to step S110. On the other hand, if a change in frequency is not detected, then it is determined that a touch on the touch panel 130 is not performed (step S200). That is, when a signal change (a change in the frequency of the detection signal SX) is not detected by the frequency modulation scheme in a case in which a signal change (a change in the amplitude of the detection signal SX) is detected by the amplitude modulation scheme, it is determined that the signal change detected by the amplitude modulation scheme results from noise.

At step S110, it is determined, by the amplitude modulation scheme, whether a detected value (first detected value) is greater than a predetermined finger detection threshold value (a threshold value for determining whether a touch with a finger is performed). If, as a result, the detected value is greater than the finger detection threshold value, then it is determined that a touch with a finger is performed (step S210). On the other hand, if the detected value is less than or equal to the finger detection threshold value, then processing proceeds to step S120.

At step S120, it is determined, by the amplitude modulation scheme, whether the detected value is greater than a predetermined conductive pen detection threshold value (a threshold value for determining whether a touch with a conductive pen is performed) or a predetermined glove detection threshold value (a threshold value for determining whether a touch with a glove is performed). If, as a result, the detected value is greater than the conductive pen detection threshold value or the glove detection threshold value, then it is determined that a touch with a conductive pen or a glove is performed (step S220). On the other hand, if the detected value is less than or equal to those threshold values, then processing proceeds to step S130, When processing proceeds to step S130 in this manner, it indicates that a weak signal is detected.

At step S130, it is determined, by the frequency modulation scheme, whether a detected value (second detected value) is greater than a predetermined first threshold value. If, as a result, the detected value is greater than the first threshold value, then a process corresponding to the first threshold value is performed (step S230). On the other hand, if the detected value is less than or equal to the first threshold value, then processing proceeds to step S140.

At step S140, it is determined, by the frequency modulation scheme, whether the detected value is greater than a predetermined second threshold value. If, as a result, the detected value is greater than the second threshold value, then a process corresponding to the second threshold value is performed (step S240). On the other hand, if the detected value is less than or equal to the second threshold value, then processing proceeds to step S150.

At step S150, it is determined, by the frequency modulation scheme, whether the detected value is greater than a predetermined third threshold value. If, as a result, the detected value is greater than the third threshold value, then a process corresponding to the third threshold value is performed (step S250). On the other hand, if the detected value is less than or equal to the third threshold value, then processing proceeds to step S160.

At step S160, it is determined, by the frequency modulation scheme, whether the detected value is greater than a predetermined fourth threshold value. If, as a result, the detected value is greater than the fourth threshold value, then a process corresponding to the fourth threshold value is performed (step S260). On the other hand, if the detected value is less than or equal to the fourth threshold value, then it is determined that a touch on the touch panel 130 is not performed (step S270).

Regarding the above-described processes, a magnitude relationship between the first to fourth threshold values is determined so as to satisfy "first threshold value>second threshold value>third threshold value>fourth threshold value". In addition, for example, the first to fourth threshold values are determined so as to correspond to the threshold values 71 to 74 shown in FIG. 27, respectively. Note that although here an example in which four threshold values are used in the frequency modulation scheme is shown, the number of threshold values is not particularly limited.

Meanwhile, the processes performed at step S230 to S260 can be determined as appropriate, depending on the recognition object corresponding to each threshold value. Conceivable processes include, for example, increasing the number of sampling, increasing a drive voltage, changing sensor gain, and switching modes.

As described above, at the above-described step S130 to S160, a process of comparing a detected value (second detected value) of a weak signal with a predetermined threshold value is performed. By this, the identification sensitivity to the weak signal is increased, enabling to perform a process appropriate to a user's usage (operating means for the touch panel 130). For example, it becomes possible to optimize the sensitivity of the touch panel 130 by increasing the drive voltage or changing the sensor gain, or to increase the resistance to noise by changing the number of sampling. In addition, it becomes possible for a system side to perform switching to an optimal mode (e.g., switching from a finger mode to a glove mode) taking into account a use, etc., depending on user's operating means used at the present time for the touch panel 130.

<5.4 Summary>

As described above, according to the first exemplary application, it becomes possible to accurately detect a touch position while preventing erroneous detection even under an environment that is susceptible to noise. In addition, according to the second exemplary application, it becomes possible to more finely identify the recognition object. Furthermore, according to the third exemplary application, it becomes possible to increase the identification sensitivity to a weak signal. From the above, according to the present embodiment, a position detection device having high resistance to noise and excellent sensitivity is implemented.

<6. Others>

While the structures of the touch panel include an "in-cell type", a "semi-in-cell type", an "on-cell type", an "out-cell type", etc., the present invention can be applied to the touch panel having any of those structures as long as the touch detection process can be performed using both the amplitude modulation scheme and the frequency modulation scheme. Regarding this, in the above, an out-cell type structure that can use both the self-capacitance scheme and the mutual capacitance scheme has been described as an example (see FIG. 13). In the following, an outline of an in-cell type (full-in-cell type) structure which is the mainstream structure in recent years will be described.

Figure 29:
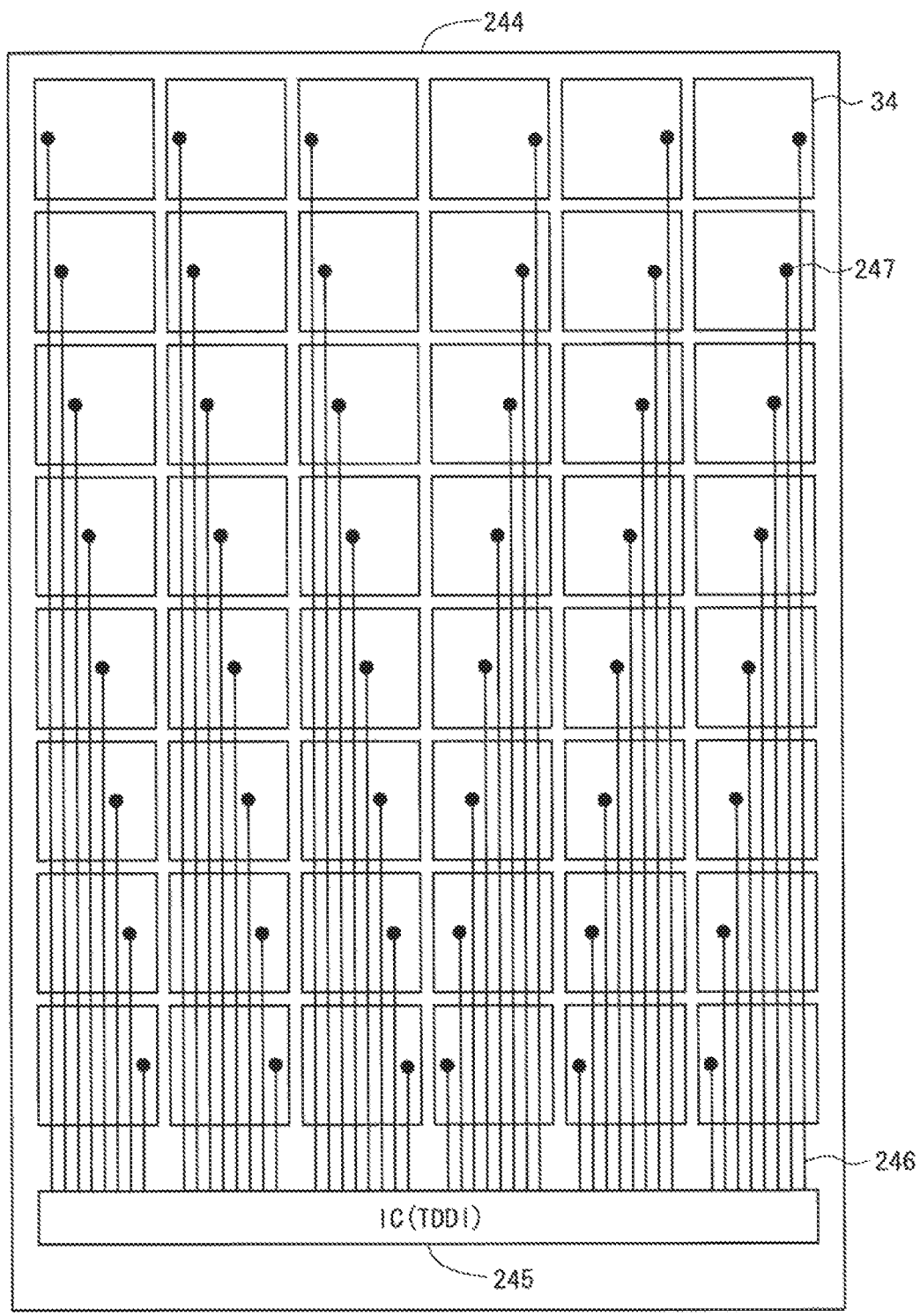
FIG. 29 is a diagram for describing a structure of an in-cell type (full-in-cell type) touch panel.

FIG. 29 is a diagram for describing a structure of an in-cell type (full-in-cell type) touch panel. The liquid crystal panel 240 (see FIG. 1) is composed of a TFT array substrate and a color filter substrate which are two glass substrates facing each other. On the TFT array substrate 244 among the two glass substrates, components for touch detection are provided. As shown in FIG. 29, on the TFT array substrate 244, the common electrode 34 (see also FIG. 1), common electrode wiring lines 246, and an IC called a Touch and Display Driver Integration (TDDI) 245 are provided, as components for touch detection. In addition, on the TFT arraysubstrate 244, contact portions 247 for connecting the common electrode 34 to the corresponding common electrode wiring line 246 are provided. The IC 245 includes therein a predetermined number of Analog Front End (AFEs). The common electrode 34 is, as shown in FIG. 29, divided into rectangular pads of a plurality of rows×a plurality of columns. One pad is a minimum unit for position detection. By a configuration such as that described above, the common electrode 34 contributes to image display and also contributes to touch detection. Note that, in a case in which the structure shown in FIG. 29 is adopted, touch detection using the self-capacitance scheme is performed.

Figure 30:
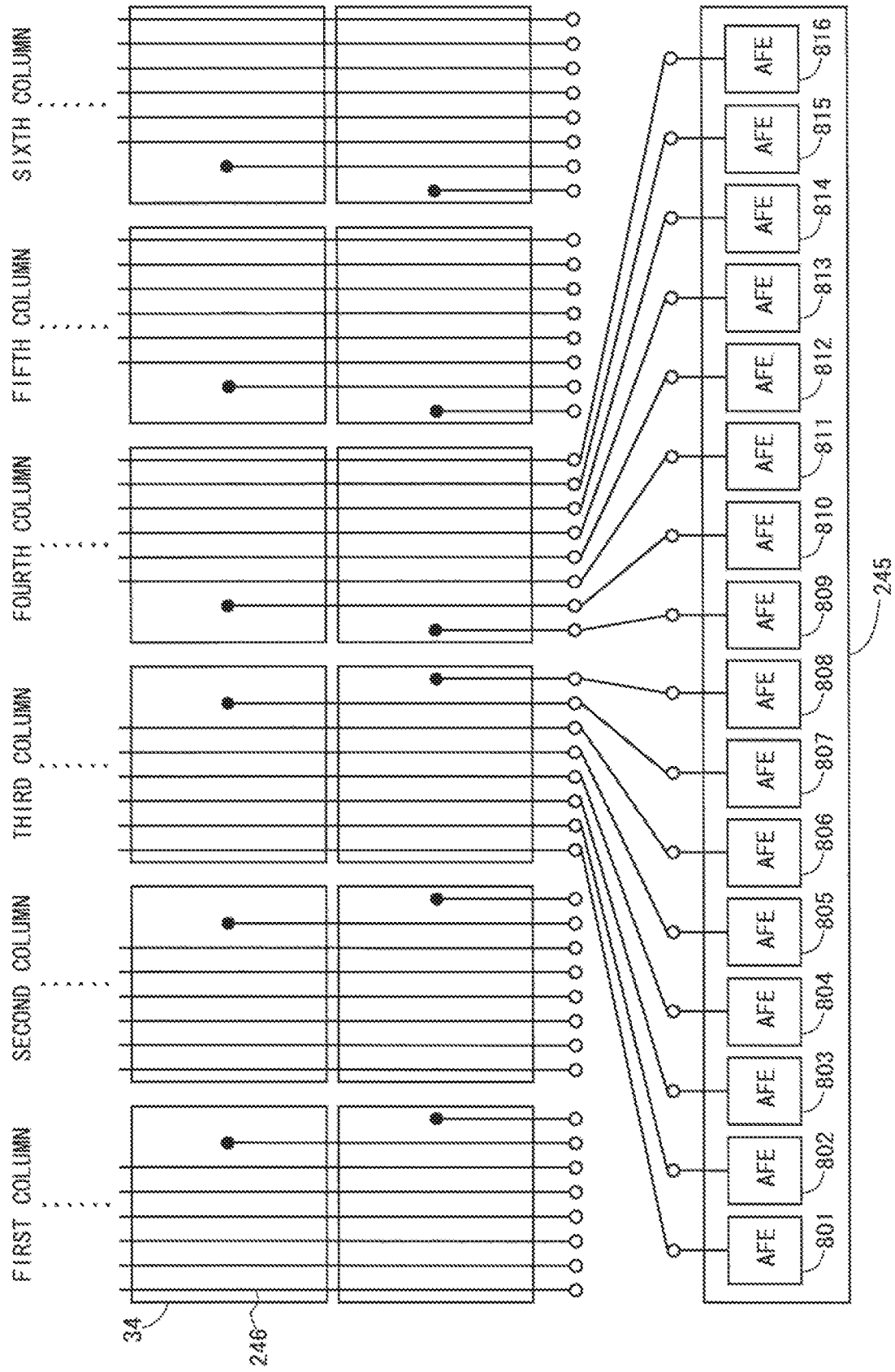
FIG. 30 is a diagram for describing exemplary driving of the in-cell type (full-in-cell type) touch panel.
Figure 31:
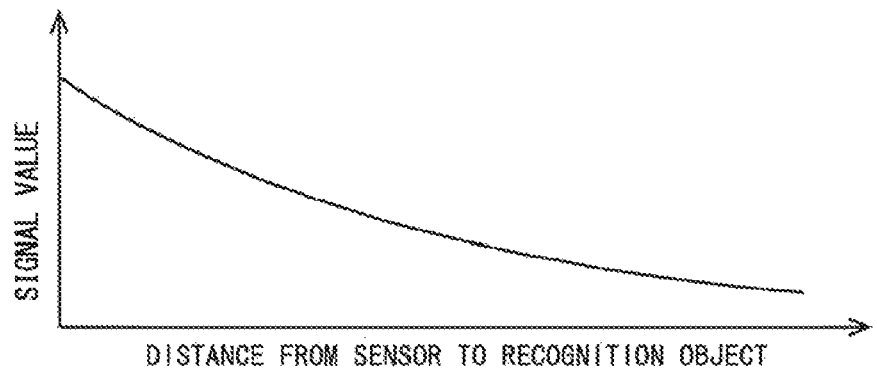
FIG. 31 is a diagram showing a relationship between a distance from a sensor to a recognition object and the signal value of a detection signal.
Figure 32A:
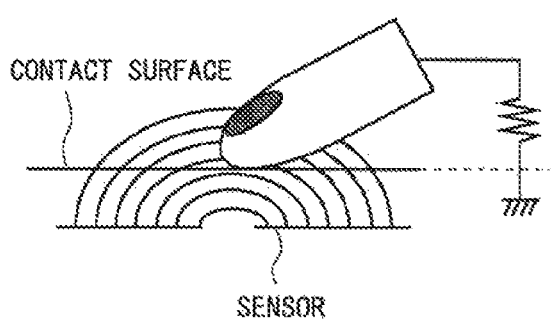
FIG. 32 is a diagram for describing that sensor sensitivity decreases by the application of a protective sheet or a protective glass onto a touch panel.
Figure 32B:
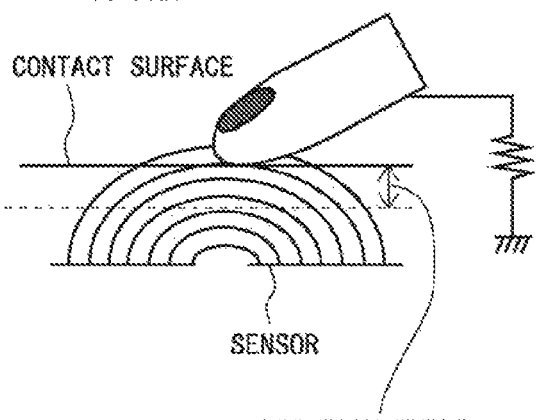

In a configuration such as that described above, touch detection is performed column by column, or row by row, or at once, depending on the number of the AFEs in the IC 245. While the common electrode 34 is divided into 48 pads (eight pads (vertical)×six pads (horizontal)) in an example shown in FIG. 29, if 48 AFEs are provided in the IC 245, then all pads can be driven at once. Further, if 16 AFEs 801 to 816 are provided in the IC 245, by controlling a connection relationship between the AFEs 801 to 816 and the common electrode wiring lines 246, for example, as follows, the pads can be driven column by column. During a given predetermined period, as shown in FIG. 30, the AFEs 801 to 808 are connected to common electrode wiring lines 246 disposed in the third column, and the AFEs 809 to 816 are connected to common electrode wiring lines 246 disposed in the fourth column. During a next predetermined period, the AFEs 801 to 808 are connected to common electrode wiring lines 246 disposed in the second column, and the AFEs 809 to 816 are connected to common electrode wiring lines 246 disposed in the fifth column. During a further next predetermined period, the AFEs 801 to 808 are connected to common electrode wiring lines 246 disposed in the first column, and the AFEs 809 to 816 are connected to common electrode wiring lines 246 disposed in the sixth column. Likewise, by switching rows to which the AFEs are connected, every predetermined period, the pads can also be driven row by row.

By adopting an in-cell type such as that described above for the structure of the touch panel, it becomes possible to achieve the slimming down and weight reduction of the entire device, and a reduction in power consumption.

<7. Additional Notes>

As the configurations of a position detection device having high resistance to noise and excellent sensitivity, etc., the following configurations are considered.

(Additional Note 1)

A position detection device having a touch sensor, the position detection device including:

a sensor driving unit configured to drive the touch sensor by providing a drive signal of a sine-wave to the touch sensor; and a position detecting unit configured to detect a position where a touch on the touch sensor is performed, based on a detection signal obtained, depending on the drive signal, from the touch sensor, wherein the position detecting unit includes:

a first detection processing unit configured to perform a touch detection process using an amplitude modulation scheme, based on the detection signal, the touch detection process including a process of determining whether there is a touch on the touch sensor; and a second detection processing unit configured to perform the touch detection process using a frequency modulation scheme, based on the detection signal, and a first detection processing period during which the touch detection process is performed by the first detection processing unit and a second detection processing period during which the touch detection process is performed by the second detection processing unit are provided.

(Additional Note 2)

The position detection device according to additional note 1, wherein the sensor driving unit:

provides the drive signal with a relatively high frequency to the touch sensor during the first detection processing period, and provides the drive signal with a relatively low frequency to the touch sensor during the second detection processing period.

(Additional Note 3)

The position detection device according to additional note 1, wherein the second detection processing unit includes:

a band-limiting unit configured to extract only a predetermined frequency component among frequency components included in the detection signal; and an amplitude-limiting unit configured to make an amplitude of an output from the band-limiting unit constant, and the second detection processing unit performs the touch detection process based on a demodulated signal obtained based on an output from the amplitude-limiting unit.

(Additional Note 4)

The position detection device according to additional note 1, wherein the sensor driving unit provides the drive signal with a frequency of 100 kHz or more to the touch sensor during the first detection processing period.

(Additional Note 5)

The position detection device according to additional note 1, wherein a frequency of the drive signal used during the first detection processing period is set such that the number of sampling Scnt satisfies a following equation (8) when a signal value of the detection signal is Vs and a noise value is Vn:

[Expression 9]

$$Scnt \geq \left(100 \times \frac{Vn}{Vs}\right)^2 \quad (8)$$

(Additional Note 6)

The position detection device according to additional note 1, wherein the first detection processing unit performs the touch detection process based on a first detected value obtained from a difference between an amplitude of the detection signal obtained when a touch on the touch sensor is performed and an amplitude of the detection signal obtained when a touch on the touch sensor is not performed, and the second detection processing unit performs the touch detection process based on a second detected value obtained from a difference between a frequency of the detection signal obtained when a touch on the touch sensor is performed and a frequency of the detection signal obtained when a touch on the touch sensor is not performed.

(Additional Note 7)

The position detection device according to additional note 6, wherein the second detection processing unit compares the second detected value with a plurality of threshold values respectively corresponding to a plurality of types of recognition objects.

(Additional Note 8)

The position detection device according to additional note 7, wherein the first detection processing unit at least compares the first detected value with a threshold value for determining whether a touch on the touch sensor with a finger is performed, before the second detection processing unit compares the second detected value with the plurality of threshold values.

(Additional Note 9)

The position detection device according to additional note 1, wherein even when the first detection processing unit determines that a touch on the touch sensor is performed, the position detecting unit determines that a touch on the touch sensor is not performed when the second detection processing unit determines that a touch on the touch sensor is not performed.

(Additional Note 10)

An electronic device including a display device having a display panel configured to display an image; and a position detection device according to additional note 1, the display device and the position detection device being integrally formed.

(Additional Note 11)

The electronic device according to additional note 10, wherein the sensor driving unit drives the touch sensor asynchronously with driving of the display panel.

(Additional Note 12)

The electronic device according to additional note 10, wherein the display device provides a synchronizing signal indicating driving timing of the display panel to the position detection device, and the sensor driving unit drives the touch sensor based on the synchronizing signal during a period during which the display panel is not driven.

(Additional Note 13)

A position detection method using a touch sensor, the position detection method including:

a sensor driving step of driving the touch sensor by providing a drive signal of a sine-wave to the touch sensor; and a position detecting step of detecting a position where a touch on the touch sensor is performed, based on a detection signal obtained, depending on the drive signal, from the touch sensor, wherein the position detecting step including:
a first detection processing step of performing a touch detection process using an amplitude modulation scheme, based on the detection signal, the touch detection process including a process of determining whether there is a touch on the touch sensor; and
a second detection processing step of performing the touch detection process using a frequency modulation scheme, based on the detection signal, and
a first detection processing period during which the touch detection process is performed in the first detection processing step and a second detection processing period during which the touch detection process is performed in the second detection processing step are provided.

According to such configurations described in additional notes 1 to 13, a touch detection process using the amplitude modulation scheme and a touch detection process using the frequency modulation scheme are performed. Therefore, as results of the touch detection processes, two types of detection results (a detection result based on the amplitude modulation scheme and a detection result based on the frequency modulation scheme) are obtained. Then, it becomes possible to determine whether there is a touch at each location and to identify a touch position, based on the two types of detection results. Here, by performing high-speed driving of the touch sensor when the touch detection process using the amplitude modulation scheme is performed, the number of sampling is increased, enabling to reduce noise. In addition, since noise occurring in an amplitude direction of a detection signal can be removed when the touch detection process using the frequency modulation scheme is performed, the resistance to noise can also be increased. Furthermore, by comparing a detected value with multiple threshold values when the touch detection process using the frequency modulation scheme is performed, identification sensitivity can be increased. From the above, a position detection device and a position detection method that have high resistance to noise and excellent sensitivity are implemented.

<8. Regarding Priority Claim>

This application claims priority to Japanese Patent Application No. 2017-120993 titled "POSITION DETECTION DEVICE, ELECTRONIC DEVICE EQUIPPED WITH SAME, AND POSITION DETECTION METHOD" filed Jun. 21, 2017, the content of which is incorporated herein by reference.

DESCRIPTION OF REFERENCE CHARACTERS

1: ELECTRONIC DEVICE
10: POSITION DETECTION DEVICE
20: LIQUID CRYSTAL DISPLAY DEVICE
100: TOUCH PANEL CONTROLLER
110: TOUCH PANEL DRIVING UNIT
120: TOUCH SENSING UNIT
121: FIRST DETECTION PROCESSING UNIT
122: SECOND DETECTION PROCESSING UNIT
130: TOUCH PANEL (TOUCH SENSOR)
200: DISPLAY CONTROLLER
240: LIQUID CRYSTAL PANEL
SD: DRIVE SIGNAL
SX: DETECTION SIGNAL
Ta: PERIOD FOR DRIVING THE LIQUID CRYSTAL PANEL
Tb: PERIOD FOR DRIVING THE TOUCH PANEL

The invention claimed is:

1. A position detection device having a touch sensor, the position detection device comprising:
a sensor driving unit configured to drive the touch sensor by providing a drive signal of a sine-wave to the touch sensor; and
a position detecting unit configured to detect a position where a touch on the touch sensor is performed, based on a detection signal obtained, depending on the drive signal, from the touch sensor, wherein
the position detecting unit includes:
a first detection processing unit configured to perform a touch detection process using an amplitude modulation scheme, based on the detection signal, the touch detection process including a process of determining whether there is a touch on the touch sensor; and
a second detection processing unit configured to perform the touch detection process using a frequency modulation scheme, based on the detection signal, and
wherein the touch detection process is performed by the first detection processing unit during a first detection processing period and the touch detection process is performed by the second detection processing unit during a second detection processing period.

2. The position detection device according to claim 1, wherein the sensor driving unit:
provides the drive signal with a high frequency to the touch sensor during the first detection processing period, and
provides the drive signal with a low frequency to the touch sensor during the second detection processing period.

3. The position detection device according to claim 1, wherein the second detection processing unit includes:
a band-limiting unit configured to extract only a predetermined frequency component among frequency components included in the detection signal; and
an amplitude-limiting unit configured to make an amplitude of an output from the band-limiting unit constant, and
the second detection processing unit performs the touch detection process based on a demodulated signal obtained based on an output from the amplitude-limiting unit.

4. The position detection device according to claim 1, wherein the sensor driving unit provides the drive signal with a frequency of 100 kHz or more to the touch sensor during the first detection processing period.

5. The position detection device according to claim 1, wherein a frequency of the drive signal used during the first detection processing period is set such that the number of sampling Scnt satisfies a following equation (8) when a signal value of the detection signal is Vs and a noise value is Vn:

$$Scnt \geq \left(100 \times \frac{Vn}{Vs}\right)^2. \tag{8}$$

6. The position detection device according to claim 1, wherein
the first detection processing unit performs the touch detection process based on a first detected value obtained from a difference between an amplitude of the detection signal obtained when a touch on the touch sensor is performed and an amplitude of the detection signal obtained when a touch on the touch sensor is not performed, and the second detection processing unit performs the touch detection process based on a second detected value obtained from a difference between a frequency of the detection signal obtained when a touch on the touch sensor is performed and a frequency of the detection signal obtained when a touch on the touch sensor is not performed.

7. The position detection device according to claim 6, wherein the second detection processing unit compares the second detected value with a plurality of threshold values each corresponding to one of a plurality of types of recognition objects.

8. The position detection device according to claim 7, wherein the first detection processing unit at least compares the first detected value with a threshold value for determining whether the touch on the touch sensor is performed with a finger, before the second detection processing unit compares the second detected value with the plurality of threshold values.

9. The position detection device according to claim 1, wherein even when the first detection processing unit determines that the touch on the touch sensor is performed, the position detecting unit determines that the touch on the touch sensor is not performed when the second detection processing unit determines that the touch on the touch sensor is not performed.

10. An electronic device including a display device having a display panel configured to display an image; and a position detection device according to claim 1, the display device and the position detection device being integrally formed.

11. The electronic device according to claim 10, wherein the sensor driving unit drives the touch sensor asynchronously with driving of the display panel.

12. The electronic device according to claim 10, wherein the display device provides a synchronizing signal indicating driving timing of the display panel to the position detection device, and the sensor driving unit drives the touch sensor based on the synchronizing signal during a period during which the display panel is not driven.

13. A position detection method using a touch sensor, the position detection method comprising:

a sensor driving step of driving the touch sensor by providing a drive signal of a sine-wave to the touch sensor; and a position detecting step of detecting a position where a touch on the touch sensor is performed, based on a detection signal obtained, depending on the drive signal, from the touch sensor, wherein the position detecting step including:

a first detection processing step of performing a touch detection process using an amplitude modulation scheme, based on the detection signal, the touch detection process including a process of determining whether there is a touch on the touch sensor; and a second detection processing step of performing the touch detection process using a frequency modulation scheme, based on the detection signal, and wherein the touch detection process is performed in the first detection processing step during a first detection processing period and the touch detection process is performed in the second detection processing step during a second detection processing period.

\* \* \* \* \*